United States Patent
Kumagai

(10) Patent No.: US 7,783,833 B2
(45) Date of Patent: Aug. 24, 2010

(54) STORAGE SYSTEM, METHOD FOR MANAGING THE SAME, AND STORAGE CONTROLLER

(75) Inventor: Atsuya Kumagai, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/155,971

(22) Filed: Jun. 12, 2008

(65) Prior Publication Data

US 2008/0256308 A1 Oct. 16, 2008

Related U.S. Application Data

(63) Continuation-in-part of application No. 11/598,673, filed on Nov. 14, 2006.

(30) Foreign Application Priority Data

| Sep. 28, 2006 | (JP) | ............... 2006-264550 |
| Mar. 26, 2008 | (JP) | ............... 2008-082042 |

(51) Int. Cl.
G06F 3/06 (2006.01)
G06F 12/00 (2006.01)
G06F 13/00 (2006.01)
G06F 13/28 (2006.01)

(52) U.S. Cl. .................. 711/114; 711/4; 711/170; 711/153

(58) Field of Classification Search .......... 711/4, 711/114, 170, 153
See application file for complete search history.

(56) References Cited

U.S. PATENT DOCUMENTS

| 5,920,893 | A  | * | 7/1999  | Nakayama et al. ........ 711/147 |
| 6,260,120 | B1 | * | 7/2001  | Blumenau et al. ........ 711/152 |
| 6,295,575 | B1 | * | 9/2001  | Blumenau et al. .......... 711/5 |
| 6,421,711 | B1 | * | 7/2002  | Blumenau et al. ........ 709/213 |
| 6,976,134 | B1 | * | 12/2005 | Lolayekar et al. ........ 711/148 |
| 2004/0117546 | A1 |  | 6/2004  | Mizuno |
| 2005/0015544 | A1 | * | 1/2005  | Zohar et al. ............ 711/113 |
| 2005/0120188 | A1 | * | 6/2005  | Kuwabara et al. ........ 711/159 |
| 2005/0210098 | A1 | * | 9/2005  | Nakamichi et al. ....... 709/203 |

FOREIGN PATENT DOCUMENTS

JP 2004-192305 12/2002

* cited by examiner

*Primary Examiner*—Sheng-Jen Tsai
*Assistant Examiner*—Michael Alsip
(74) *Attorney, Agent, or Firm*—Stites & Harbison, PLLC; Juan Carlos A. Marquez, Esq

(57) ABSTRACT

A storage system includes one or more host computers; and a storage controller that provides each of the one or more host computers with a plurality of logical volumes, each including a storage area for reading/writing data from/to, and also being either allocated or not allocated to one or more of the host computers, the storage controller including: an identification unit that identifies function information relating to a logical volume from among the plurality of logical volumes included in information relating to the plurality of logical volumes based on a command from a host computer from among the one or more host computers; and an execution unit that executes processing on the logical volume in accordance with an identification result of the identification unit.

9 Claims, 26 Drawing Sheets

FIG.3

| INITIATOR NAME | TARGET NAME | ASSIGNED PORTS | | LUN | DISK USAGE |
|---|---|---|---|---|---|
| | | 192.168.0.1 | 192.168.0.2 | | |
| initiator0 | iqn.init000-20gb-jbod-lu0 | 1 | 0 | 0 | 20 |
| initiator0 | iqn.init000-10gb-raid1-lu1 | 0 | 1 | 1 | 20 |
| initiator0 | iqn.init000-40gb-jbod-lu2 | 1 | 1 | - | - |
| initiator0 | iqn.init000-20gb-jbod-lu2 | 1 | 1 | - | - |
| initiator0 | iqn.init000-20gb-raid1-lu2 | 1 | 1 | - | - |
| initiator0 | iqn.init000-10gb-raid1-lu2 | 1 | 1 | - | - |
| initiator0 | iqn.init000-delete-lu0 | 1 | 1 | - | - |
| initiator0 | iqn.init000-delete-lu1 | 1 | 1 | - | - |
| initiator1 | iqn.init001-80gb-jbod-lu0 | 1 | 1 | 0 | 80 |
| initiator1 | iqn.init001-60gb-jbod-lu0 | 1 | 1 | - | - |
| initiator1 | iqn.init001-40gb-jbod-lu0 | 1 | 1 | - | - |
| initiator1 | iqn.init001-20gb-jbod-lu0 | 1 | 1 | - | - |
| initiator1 | iqn.init001-40gb-raid1-lu0 | 1 | 1 | - | - |
| initiator1 | iqn.init001-30gb-raid1-lu0 | 1 | 1 | - | - |
| initiator1 | iqn.init001-20gb-raid1-lu0 | 1 | 1 | - | - |
| initiator1 | iqn.init001-10gb-raid1-lu0 | 1 | 1 | - | - |

301 302 303 304 305

202

| INITIATOR NUMBER (401) | INITIATOR NAME (402) | MAXIMUM DISK USAGE (403) |
|---|---|---|
| 000 | initiator0 | 80 |
| 001 | initiator1 | 80 |

| INITIATOR NAME | TARGET NAME | ASSIGNED PORTS | | LUN | DISK USAGE |
|---|---|---|---|---|---|
| | | 192.168.0.1 | 192.168.0.2 | | |
| initiator0 | iqn.init000-20gb-jbod-lu0 | 1 | 0 | 0 | 20 |
| initiator0 | iqn.init000-10gb-raid1-lu1 | 0 | 1 | 1 | 20 |
| initiator0 | iqn.init000-40gb-jbod-lu2 | 1 | 1 | - | - |
| initiator0 | iqn.init000-20gb-jbod-lu2 | 1 | 1 | - | - |
| initiator0 | iqn.init000-20gb-raid1-lu2 | 1 | 1 | - | - |
| initiator0 | iqn.init000-10gb-raid1-lu2 | 1 | 1 | - | - |
| initiator0 | iqn.init000-delete-lu0 | 1 | 1 | - | - |
| initiator0 | iqn.init000-delete-lu1 | 1 | 1 | - | - |
| initiator0 | iqn.init000-20gb-raid1-ntfs-lu2 | 1 | 1 | - | - |
| initiator1 | iqn.init001-80gb-jbod-lu0 | 1 | 1 | 0 | 80 |
| initiator1 | iqn.init001-60gb-jbod-lu0 | 1 | 1 | - | - |
| initiator1 | iqn.init001-40gb-jbod-lu0 | 1 | 1 | - | - |
| initiator1 | iqn.init001-20gb-jbod-lu0 | 1 | 1 | - | - |
| initiator1 | iqn.init001-40gb-raid1-lu0 | 1 | 1 | - | - |
| initiator1 | iqn.init001-30gb-raid1-lu0 | 1 | 1 | - | - |
| initiator1 | iqn.init001-20gb-raid1-lu0 | 1 | 1 | - | - |
| initiator1 | iqn.init001-10gb-raid1-lu0 | 1 | 1 | - | - |

202A

FIG.10

| INITIATOR NAME (301) | TARGET NAME (302) | ASSIGNED PORTS (303) | | LUN (304) | DISK USAGE (305) |
|---|---|---|---|---|---|
| | | 192.168.0.1 | 192.168.0.2 | | |
| initiator0 | iqn.init000-20gb-jbod-lu0 | 1 | 0 | 0 | 20 |
| initiator0 | iqn.init000-10gb-raid1-lu1 | 0 | 1 | 1 | 20 |
| initiator0 | iqn.init000-40gb-jbod-lu2 | 1 | 1 | - | - |
| initiator0 | iqn.init000-20gb-jbod-lu2 | 1 | 1 | - | - |
| initiator0 | iqn.init000-20gb-raid1-lu2 | 1 | 1 | - | - |
| initiator0 | iqn.init000-10gb-raid1-lu2 | 1 | 1 | - | - |
| initiator0 | iqn.init000-delete-lu0 | 1 | 1 | - | - |
| initiator0 | iqn.init000-delete-lu1 | 1 | 1 | - | - |
| initiator0 | iqn.init000-backup-lu0 | 1 | 1 | - | - |
| initiator0 | iqn.init000-backup-lu1 | 1 | 1 | - | - |
| initiator1 | iqn.init001-80gb-jbod-lu0 | 1 | 1 | 0 | 80 |
| initiator1 | iqn.init001-60gb-jbod-lu0 | 1 | 1 | - | - |
| initiator1 | iqn.init001-40gb-jbod-lu0 | 1 | 1 | - | - |
| initiator1 | iqn.init001-20gb-jbod-lu0 | 1 | 1 | - | - |
| initiator1 | iqn.init001-40gb-raid1-lu0 | 1 | 1 | - | - |
| initiator1 | iqn.init001-30gb-raid1-lu0 | 1 | 1 | - | - |
| initiator1 | iqn.init001-20gb-raid1-lu0 | 1 | 1 | - | - |
| initiator1 | iqn.init001-10gb-raid1-lu0 | 1 | 1 | - | - |

| INITIATOR NAME | TARGET NAME | ASSIGNED PORTS | | LUN | DISK USAGE |
|---|---|---|---|---|---|
| | | 192.168.0.1 | 192.168.0.2 | | |
| initiator0 | iqn.init000-20gb-jbod-lu0 | 1 | 0 | 0 | 20 |
| initiator0 | iqn.init000-10gb-raid1-lu1 | 0 | 1 | 1 | 20 |
| initiator0 | iqn.init000-40gb-jbod-lu2 | 1 | 1 | - | - |
| initiator0 | iqn.init000-20gb-jbod-lu2 | 1 | 1 | - | - |
| initiator0 | iqn.init000-20gb-raid1-lu2 | 1 | 1 | - | - |
| initiator0 | iqn.init000-10gb-raid1-lu2 | 1 | 1 | - | - |
| initiator0 | iqn.init000-delete-lu0 | 1 | 1 | - | - |
| initiator0 | iqn.init000-delete-lu1 | 1 | 1 | - | - |
| initiator0 | iqn.init000-showconfig-ntfs | 1 | 1 | - | - |
| initiator1 | iqn.init001-80gb-jbod-lu0 | 1 | 1 | 0 | 80 |
| initiator1 | iqn.init001-60gb-jbod-lu0 | 1 | 1 | - | - |
| initiator1 | iqn.init001-40gb-jbod-lu0 | 1 | 1 | - | - |
| initiator1 | iqn.init001-20gb-jbod-lu0 | 1 | 1 | - | - |
| initiator1 | iqn.init001-40gb-raid1-lu0 | 1 | 1 | - | - |
| initiator1 | iqn.init001-30gb-raid1-lu0 | 1 | 1 | - | - |
| initiator1 | iqn.init001-20gb-raid1-lu0 | 1 | 1 | - | - |
| initiator1 | iqn.init001-10gb-raid1-lu0 | 1 | 1 | - | - |

| INITIATOR NAME | TARGET NAME | ASSIGNED PORTS | | LUN | DISK USAGE |
|---|---|---|---|---|---|
| | | 192.168.0.1 | 192.168.0.2 | | |
| initiator0 | iqn.init000-20gb-jbod-lu0 | 1 | 0 | 0 | 20 |
| initiator0 | iqn.init000-10gb-raid1-lu1 | 0 | 1 | 1 | 20 |
| initiator0 | iqn.init000-40gb-jbod-lu2 | 1 | 1 | - | - |
| initiator0 | iqn.init000-20gb-jbod-lu2 | 1 | 1 | - | - |
| initiator0 | iqn.init000-20gb-raid1-lu2 | 1 | 1 | - | - |
| initiator0 | iqn.init000-10gb-raid1-lu2 | 1 | 1 | - | - |
| initiator0 | iqn.init000-delete-lu0 | 1 | 1 | - | - |
| initiator0 | iqn.init000-delete-lu1 | 1 | 1 | - | - |
| initiator0 | iqn.init000-changepassword-ntfs | 1 | 1 | - | - |
| initiator1 | iqn.init001-80gb-jbod-lu0 | 1 | 1 | 0 | 80 |
| initiator1 | iqn.init001-60gb-jbod-lu0 | 1 | 1 | - | - |
| initiator1 | iqn.init001-40gb-jbod-lu0 | 1 | 1 | - | - |
| initiator1 | iqn.init001-20gb-jbod-lu0 | 1 | 1 | - | - |
| initiator1 | iqn.init001-40gb-raid1-lu0 | 1 | 1 | - | - |
| initiator1 | iqn.init001-30gb-raid1-lu0 | 1 | 1 | - | - |
| initiator1 | iqn.init001-20gb-raid1-lu0 | 1 | 1 | - | - |
| initiator1 | iqn.init001-10gb-raid1-lu0 | 1 | 1 | - | - |

| 401 | 402 | 403 | 404 |
|---|---|---|---|
| INITIATOR NUMBER | INITIATOR NAME | MAXIMUM DISK USAGE | PASSWORD |
| 000 | initiator0 | 80 | 3f-/sQw4y |
| 001 | initiator1 | 80 | R9[p31-fv |

| INITIATOR NAME | LUN | P/S | STATUS | ELAPSED TIME | PERCENTAGE OF COMPLETION | THROUGHPUT | REMAINING TIME | PAIR LU |
|---|---|---|---|---|---|---|---|---|
| initiator0 | 0 | - | SMPL | - | - | - | - | - |
| initiator0 | 1 | P | PAIR | - | - | - | - | 2 |
| initiator0 | 2 | S | PAIR | - | - | - | - | 1 |
| initiator0 | 3 | P | SUS | - | - | - | - | 4 |
| initiator0 | 4 | S | SUS | - | - | - | - | 3 |
| initiator0 | 5 | P | COPY | 00:01:42 | 38.2 | 233 | 00:02:45 | 6 |
| initiator0 | 6 | S | COPY | 00:01:42 | 38.2 | 233 | 00:02:45 | 5 |
| initiator1 | 0 | - | SMPL | - | - | - | - | - |

| | 1901 | 1902 | 1903 | 1904 | 1905 | 1906 | 1907 |

| SATUS | "PAIRCREATE" | "SPLIT" | "SUSPEND" | "RESYNC" | "RESTORE" | "ABORT" |
|---|---|---|---|---|---|---|
| SMPL | 1 | 0 | 0 | 0 | 0 | 0 |
| PAIR | 0 | 1 | 1 | 0 | 0 | 0 |
| SUS | 0 | 1 | 0 | 1 | 1 | 0 |
| COPY | 0 | 0 | 0 | 0 | 0 | 1 |

FIG.21

TARGET TABLE

| 301 | 302 | 303 | | 304 | 305 |
|---|---|---|---|---|---|
| INITIATOR NAME | TARGET NAME | ASSIGNED PORTS | | LUN | DISK USAGE |
| | | 192.168.0.1 | 192.168.0.2 | | |
| initiator0 | iqn.init000-lu0 | 1 | 0 | 0 | 20 |
| initiator0 | iqn.init000-lu1 | 0 | 1 | 1 | 20 |
| initiator0 | iqn.init000-lu3 | 1 | 1 | 3 | 50 |
| initiator0 | iqn.init000-lu0-paircreate | 1 | 1 | - | - |
| initiator0 | iqn.init000-lu1-split | 1 | 1 | - | - |
| initiator0 | iqn.init000-lu1-suspend | 1 | 1 | - | - |
| initiator0 | iqn.init000-lu3-split | 1 | 1 | - | - |
| initiator0 | iqn.init000-lu3-resync | 1 | 1 | - | - |
| initiator0 | iqn.init000-lu3-restore | 1 | 1 | - | - |
| initiator0 | iqn.init000-lu5-abort | 1 | 1 | - | - |
| initiator0 | iqn.init000-lu0:smpl | 1 | 1 | - | - |
| initiator0 | iqn.init000-lu1:p-pair | 1 | 1 | - | - |
| initiator0 | iqn.init000-lu2:s-pair | 1 | 1 | - | - |
| initiator0 | iqn.init000-lu3:p-sus | 1 | 1 | - | - |
| initiator0 | iqn.init000-lu4:s-sus | 1 | 1 | - | - |
| initiator0 | iqn.init000-lu5:p-copy-00:01:42-38.2percent-233mbps-00:02:45 | 1 | 1 | - | - |
| initiator0 | iqn.init000-lu6:s-copy-00:01:42-38.2percent-233mbps-00:02:45 | 1 | 1 | - | - |
| initiator1 | iqn.init001-lu0 | 1 | 1 | 0 | 40 |
| initiator1 | iqn.init001-paircreate-lu0 | 1 | 1 | - | - |

STORAGE SYSTEM, METHOD FOR MANAGING THE SAME, AND STORAGE CONTROLLER

CROSS-REFERENCES TO RELATED APPLICATIONS

This application is a Continuation-In-Part Application of U.S. patent application Ser. No. 11/598,673 filed on Nov. 14, 2006 and relates to and claims priority from Japanese Patent Application No. 2008-082042, filed on Mar. 26, 2008, the entire disclosure of which is incorporated herein by reference.

BACKGROUND

1. Field of the Invention

The invention relates to an interface technique for configuring a storage system, a method for managing the same, and a storage controller.

2. Description of Related Art

In recent years, many kinds of network connection functions have been employed in storage apparatuses. With these network connection functions, the storage apparatuses can send/receive data or commands to/from computers via Fibre Channel networks or IP (Internet Protocol) networks. iSCSI (Internet Small Computer Systems Interface) protocol has become the standard protocol for SCSI command transmission according to TCP/IP (Transmission Control Protocol/Internet Protocol), and more and more storage apparatuses that use iSCSI protocol have being used.

Conventionally, in order to connect a computer and a storage apparatus that uses iSCSI protocol to enable the computer to access the storage area in the storage apparatus as an SCSI device, it is necessary that an administrator set information like the initiator name, the target name, etc., in the storage apparatus, and notify the user of the computer of that information, and that the user then set the information in the computer.

Ordinarily, the aforementioned procedure is required for every user, and the RAID (Redundant Array of Inexpensive/Independent Disks) level or capacity of LUs (Logical Units) to be set differ depending on the user. Accordingly, there has been a problem in that the administrator's burden will increase as the number of users that use the iSCSI storage apparatus increases.

As a method for solving this problem, a technique in which the right to configure the storage apparatus that uses iSCSI protocol is assigned to users, and the users perform part of the aforementioned configuration is possible.

JP2004-192305A discloses a technique that can respond to changes in the internal status of a storage apparatus that uses iSCSI protocol, where the changes are related to data transfer or data copying within the storage apparatus.

SUMMARY

However, if the right to configure a storage apparatus that uses iSCSI protocol is assigned to users, another problem will arise in that free space on the storage apparatus disks will be depleted as a result of no limitations on the disk space being allocated by the users.

Also, conventionally, administrators use software particular to iSCSI storage apparatuses to configure the settings via management terminals. Accordingly, still another problem will arise in that it will be necessary to install that particular software in each computer in order to assign the configuration right to the users.

Therefore, an object of the present invention is to provide a storage system, a method for managing the same, and a storage controller, to obtain a storage apparatus that uses iSCSI protocol, which makes it possible for each user to configure the necessary settings within the scope of their provided right without installing software particular to the storage apparatus in each computer.

In order to achieve the above object, the present invention provides a storage system including: one or more host computers; and a storage controller that provides each of the one or more host computers with a plurality of logical volumes, each including a storage area for reading/writing data from/to, and also being either allocated or not allocated to one or more of the host computers, the storage controller including: an identification unit that identifies function information relating to a logical volume from among the plurality of logical volumes included in information relating to the plurality of logical volumes based on a command from a host computer from among the one or more host computers; and an execution unit that executes processing on the logical volume in accordance with an identification result of the identification unit.

Accordingly, processing according to the function information relating to the logical volume can be performed within the storage apparatus.

The present invention also provides a method for managing a storage system including one or more host computers, and a storage controller that provides each of the one or more host computers with a plurality of logical volumes, each including a storage area for reading/writing data from/to, and also being either allocated or not allocated to one of the host computers, the method including: an identification step of the storage controller identifying function information relating to a logical volume from among the plurality of logical volumes included in information relating to the plurality of logical volumes based on a command from a host computer from among the one or more host computers; and an execution step of the storage controller executing processing on the logical volume in accordance with an identification result of the identification unit.

Accordingly, processing according to the function information relating to the logical volume can be performed within the storage apparatus.

The present invention further provides a storage controller that provides each of one or more host computers with a plurality of logical volumes, each including a storage area for reading/writing data from/to, and also being either allocated or not allocated to one or more of the host computers, the storage controller including: an identification unit that identifies function information relating to a logical volume from among the plurality of logical volumes included in information relating to the plurality of logical volumes based on a command from a host computer from among the one or more host computers; and an execution unit that executes processing on the logical volume in accordance with an identification result of the identification unit.

Accordingly, processing according to the function information relating to the logical volume can be performed within the storage apparatus.

According to the present invention, a user can configure a storage apparatus within the right provided to the user, without using software particular to the storage apparatus, so the administrator's burden of configuration can be reduced.

Other aspects and advantages of the invention will be apparent from the following description and the appended claims.

BRIEF DESCRIPTION OF THE DRAWINGS

FIG. 3 shows a target table according to the first embodiment.

FIG. 9 shows a target table according to a second embodiment.

FIG. 10 shows a target table according to a third embodiment.

FIG. 12 shows a target table according to a fourth embodiment.

FIG. 14 shows a target table according to a fifth embodiment.

FIG. 18 shows an LU table according to the sixth embodiment.

FIG. 19 shows a command table according to the sixth embodiment.

FIG. 21 shows a target table according to the sixth embodiment.

DETAILED DESCRIPTION OF PREFERRED EMBODIMENTS

(1) First Embodiment

A first embodiment of the present invention will be explained taking, as an example, the case where a storage apparatus creates a new LU.

Figure 1:
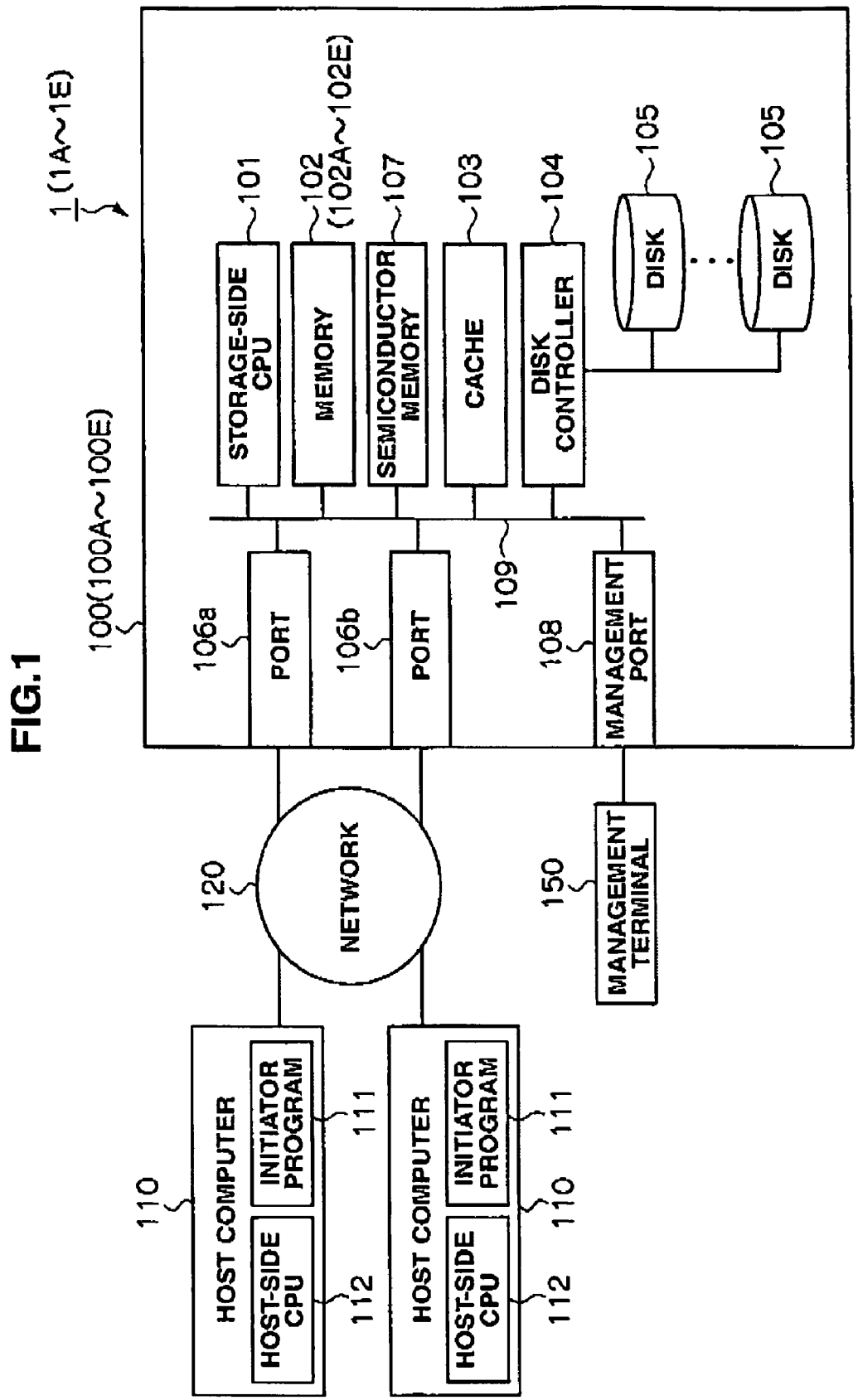
FIG. 1 is a schematic view of a storage system according to a first embodiment.

FIG. 1 is a schematic view of a storage system according to the first embodiment. As shown in FIG. 1, the storage system 1 includes a storage apparatus 100 and host computers 110 interconnected via a network 120 such as the Internet or an intranet, and a management terminal 150 connected to the storage apparatus 100.

The host computers 110 are information processing apparatuses that execute applications involving data input/output, and each include an initiator program 111 for accessing the storage apparatus 100, and a host-side CPU (Central Processing Unit) 112 for executing the initiator program 111.

The storage apparatus 100 has a storage-side CPU (control unit) 101, memory (control unit) 102, cache 103 for speeding up access, a disk controller 104, one or more disks 105, ports 106a and 106b (hereinafter also collectively referred to as "ports 106"), semiconductor memory 107 made of, for example, flash memory, a management port 108, and a bus 19 connecting these components.

The storage-side CPU 101 performs various kinds of processing, which will be explained later, by executing a target program 201 stored in the memory 102.

The memory 102 is a device for storing the target program 201, which will be described later, and data.

The cache 103 is a device for temporarily storing write data.

The disk controller 104 is a device for controlling data input/output to/from the disks 105. The disk controller 104 may be one that can perform RAID processing.

The disks 105 are devices for storing data written/read by the host computers 110.

The ports 106 are devices, like network cards, for connecting a LAN (Local Area Network) cable to the storage apparatus 100, and perform data transmission processing. In this embodiment, the storage apparatus 100 has two ports 106a and 106b, but may have three or more ports 106.

The semiconductor memory 107 is a device for storing a program read by the memory 102 at the start of the storage apparatus 100, and data.

The management port 108 is a device for connecting the storage apparatus 100 to the management terminal 150.

The management terminal 150 is a computer that configures the settings, like the later-described setting of the maximum disk usage for LUs for every user, on the storage apparatus 100 via the management port 108 of the storage apparatus 100.

Figure 2:
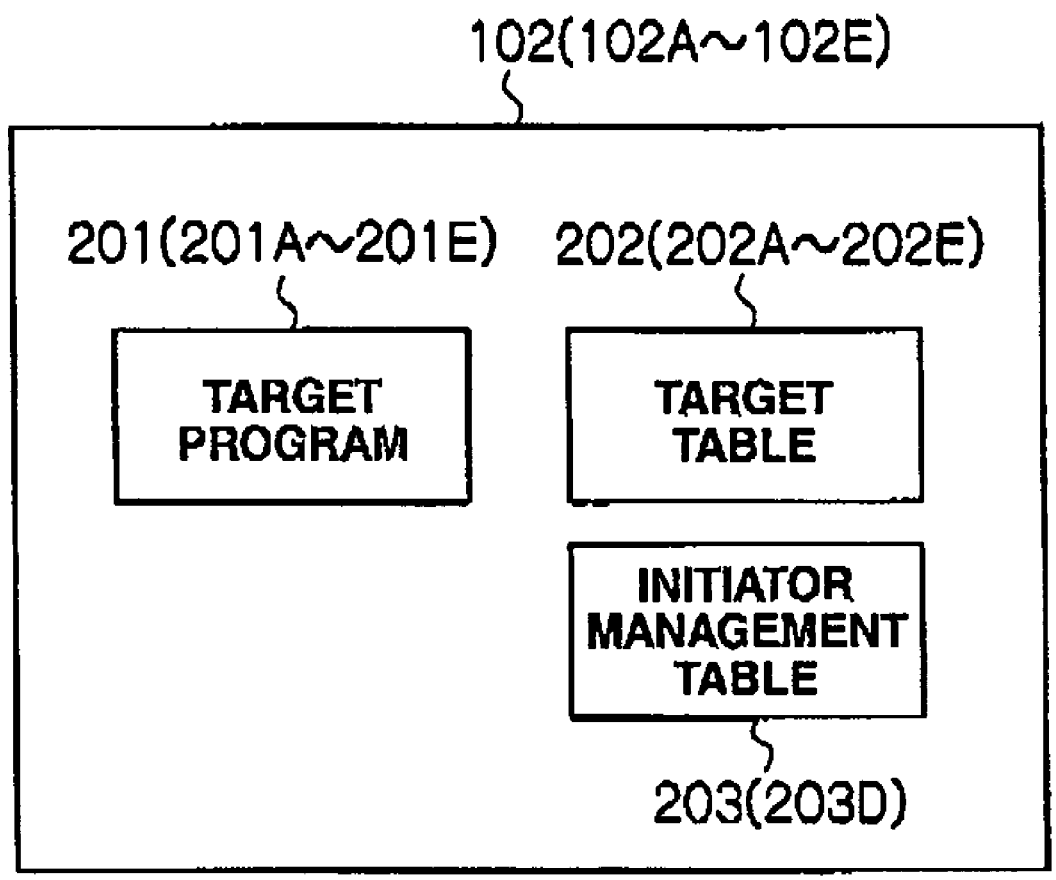
FIG. 2 is a block diagram showing the inside of memory according to the first embodiment.

FIG. 2 shows programs and data stored in the memory 102 in the storage apparatus 100 (see FIG. 1). The memory 102 stores a target program 201, a target table 202, and an initiator management table 203.

The target program 201 is a program for sending/receiving iSCSI PDUs (Protocol Data Units) according to the iSCSI standards to/from the initiator programs 111 operating on the host computers 110. The target program 201 creates, adds, or deletes LUs or targets upon receipt of iSCSI Login PDUs according to processing performed by the initiator program 111 in the host-side CPU 112. The details of this operation will be explained later with reference to FIGS. 5 to 8.

The target table 202 is a table showing the association between the initiators, the targets, the ports, and the LUs, and the capacities of the relevant LUs. The details will be explained later with reference to FIG. 3. The initiator management table 203 is a table showing the upper limit disk usage for LUs allocated to each initiator. The details will be explained later with reference to FIG. 4.

FIG. 3 shows an example of the target table 202. In FIG. 3, the target table 202 is a table having "INITIATOR NAME" fields 301, "TARGET NAME" fields 302, "ASSIGNED PORT" fields 303, "LUN" fields 304, and "DISK USAGE" fields 305.

Each "INITIATOR NAME" field 301 stores a name for identifying an iSCSI initiator. Each "TARGET NAME" field 302 stores a name for identifying an iSCSI target. The target name is configured as volume information relating to a logical volume, and the "TARGET NAME" field 302 stores information like "iqn. Init000-20gb-jbod-lu0" as function information relating to a logical volume.

Each "ASSIGNED PORT" field 303 stores information showing whether or not each of the ports 106 allows the relevant initiator's access to the relevant target.

For example, it stores "1" if the relevant port allows access, and "0" if it does not. In this embodiment, an example is explained where the storage apparatus 100 has two ports 106a and 106b, and these ports are identified with IP addresses "192.168.0.1" and "192.168.0.2," respectively. The FIG. 3 example shows that the initiator identified with the initiator name "initiator0" can access the target identified with the target name "iqn.init000-20gb-jbod-lu0" via the port identified with the IP address "192.168.0.1," but cannot access it via the port identified with the IP address "192.168.0.2".

Each "LUN" field 304 stores the number for identifying the LU allocated to the relevant host computer 110. The "-" in the "LUN" fields 304 indicates LUs not allocated to the host computers.

Each "DISK USAGE" field 305 shows the relevant LU capacity. In this embodiment, the "DISK USAGE" fields 305 show the capacities in gigabytes. The FIG. 3 example shows that the capacity of the LU with the LUN "0" that can be used by the initiator identified with the initiator name "initiator0" accessing the target identified with the target name "iqn.init000-20gb-jbod-lu0" is 20 gigabytes.

Figures 4, 5:
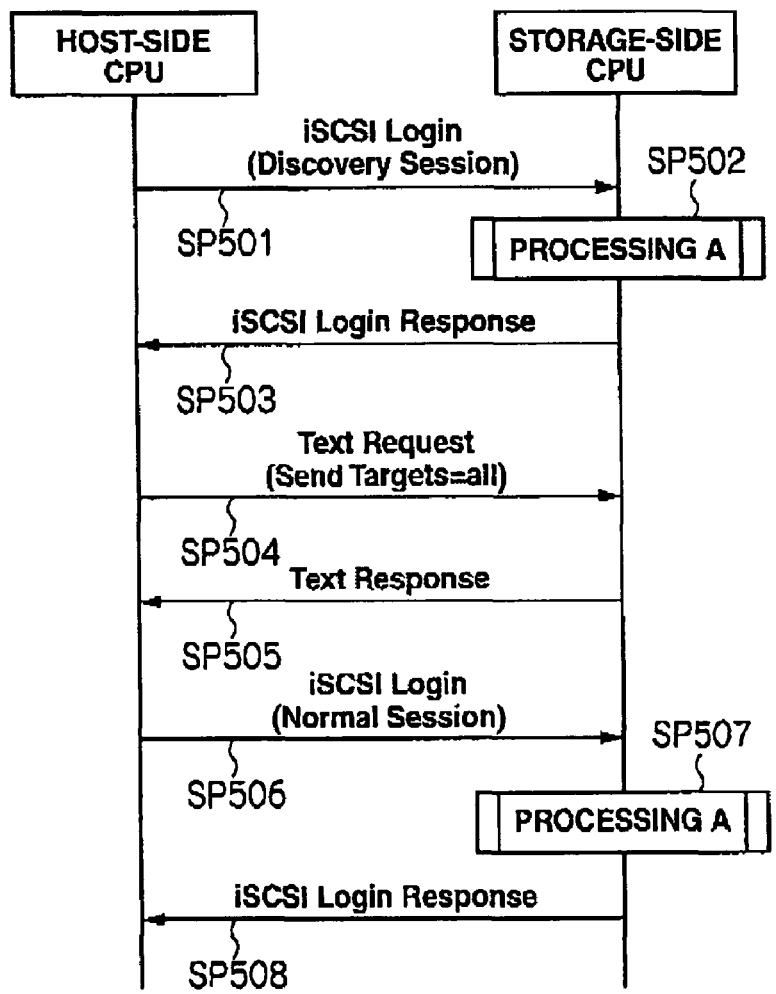
FIG. 4 shows an initiator management table according to the first embodiment.
FIG. 5 shows a diagram showing the sequence during iSCSI login in the first embodiment.

FIG. 4 shows an example of the initiator management table 203. The initiator management table 203 is a table including "INITIATOR NUMBER" fields 401, "INITIATOR NAME" fields 402, and "MAXIMUM DISK USAGE" fields 403.

Each "INITIATOR NUMBER" field 404 stores a number that is valid only within the storage apparatus, which is provided for the storage apparatus 100 to identify the relevant initiator. Each "INITIATOR NAME" field 402, as described above, stores the name for identifying the relevant initiator.

Each "MAXIMUM DISK USAGE" field 403 shows the upper limit capacity allocated to the relevant initiator. In this embodiment, an administrator sets the maximum disk usage for each initiator using the management terminal 150. The FIG. 4 example shows that the initiator number assigned by the storage apparatus 100 to the initiator with the initiator name "initiator0" is "000," and that the upper limit of the disk usage allocated to that initiator is 80 gigabytes.

FIG. 5 shows the exchange of messages and data between the host-side CPU 112 and the storage-side CPU 101 when the host-side CPU 112 sends an iSCSI Login Request PDU to the storage-side CPU101 using the initiator program 111. The storage-side CPU 101 performs the processing using the target program 201.

First, the host-side CPU 112 issues a discovery session command. With this issuance, information like the target names can be obtained. Then, the host-side CPU 112 sends an iSCSI Request PDU to the storage apparatus 100 to make a request for the start of a discovery session and also for login (SP501).

The storage-side CPU 101, upon receipt of the iSCSI Login Request PDU for the discovery session, performs processing A (SP502), and then sends an iSCSI Login Response PDU to the relevant host computer 110 as a response to the iSCSI Login Request PDU (SP503). As a result, the storage-side CPU 101 allows the host computer 110 to log in. The storage-side CPU 101 sets the return value for the immediately previous processing A as the value for the Status field in the iSCSI Login Response PDU (SP502). The details of processing A will be explained later with reference to FIG. 6.

The host-side CPU 112, upon the establishment of the discovery session, sends a Text Request PDU, which requests information like target names, to the storage apparatus 110 (SP504).

The storage-side CPU 101, upon receipt of the Text Request PDU sent by the host-side CPU112, refers to the target table 202. The storage-side CPU 101 includes all the target names associated with the initiator name in the relevant "INITIATOR NAME" fields in a Text Response PDU, and sends it to the host computer 110 (SP505). As a result, multiple names can be indicated on the host computer 110 side, and accordingly, a user can decide which target name to log in to.

The host-side CPU 112, having been notified of the target names as a result of the discovery session, sends an iSCSI Login PDU, which makes a request for a normal session (normal mode login) to the storage apparatus 100 (SP506).

The storage-side CPU 101, upon receipt of the iSCSI Login Request PDU, which requests normal mode login, performs processing A (SP507), and then sets the return value for the immediately previous processing A as the value for the relevant Status field, as a response to the iSCSI Login Request PDU, and sends the iSCSI Login Response PDU to the host computer 110 (SP508). In other words, the storage-side CPU 101 sends a notice indicating whether or not it will allow the host computer 110 to login to the designated target. The details of processing A will be explained later with reference to FIG. 6.

Figure 6:
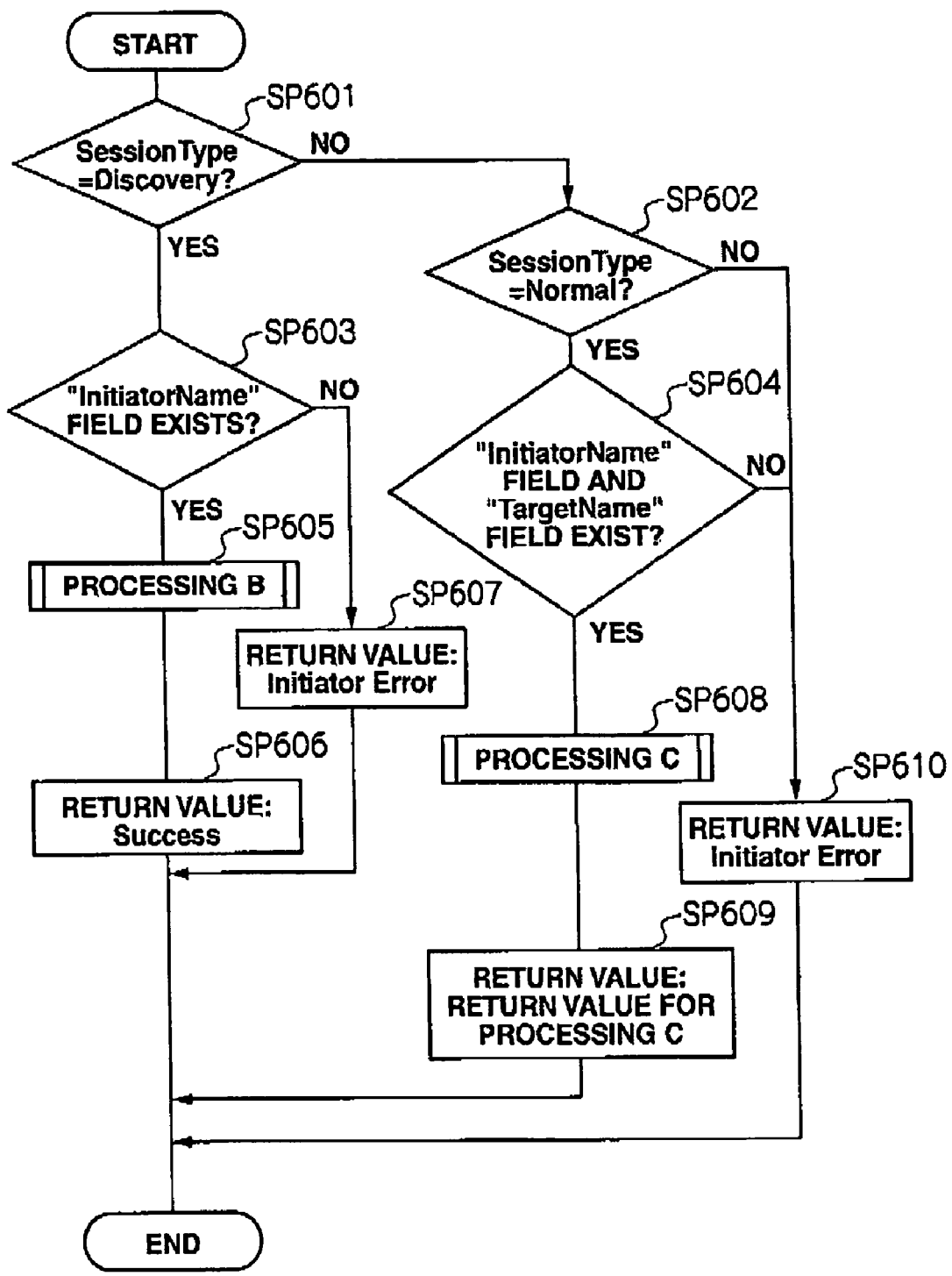
FIG. 6 is a flowchart showing processing A performed based on a target program in the first embodiment.

FIG. 6 is a flowchart showing processing A performed by the storage-side CPU 101 by executing the target program 201. First, the storage-side CPU 101, upon receipt of an iSCSI Login PDU from a host computer 110 (SP501), reads the value for the "Session Type" field contained in the iSCSI Login PDU command.

The storage-side CPU 101 judges whether or not the "Session Type" in the iSCSI Login PDU is "Discovery" (SP601). Then if the storage-side CPU 101 judges the "Session Type" to be "Discovery" (SP601: YES), then it judges whether or not the "Initiator Name" field exists in the iSCSI Login PDU command (SP603).

If the storage-side CPU 101 judges the "Initiator Name" field as existing in that command (SP603: YES), it executes the later-described processing B using the "Initiator Name" field value as an argument (SP605), and sets "Success," representing the login success, as the return value (SP606), and terminates processing A.

Meanwhile, if the storage-side CPU 101 judges at step SP603 that the "Initiator Name" field does not exist (SP603: NO), it sets "Initiator Error," representing the login failure, as the return value (SP607), and terminates processing A.

Also, if the storage-side CPU 101 judges at step SP601 that the "Session Type" field value is not "Discovery" (SP601 NO), which means that it judges the iSCSI Login PDU to be one requesting step SP507, then it judges whether or not the value in the "Session Type" field is "Normal" (SP602).

If the storage-side CPU 101 judges that the "Session Type" field value is "Normal" (SP602: YES), then it judges whether or not the "Initiator Name" field and the "Target Name" field exist in the iSCSI Login PDU command (SP604).

If the storage-side CPU 101 judges that both fields exist (SP604: YES), it executes processing C using the values in the "Initiator Name" field and the "Target Name" field as arguments (SP608). The storage-side CPU 101 sets the return value for processing C representing the login success or failure as the return value for processing A (SP609), and terminates processing A.

If the storage-side CPU 101 judges at least one of the "Initiator Name" field and the "Target Name" field as not existing (SP604: NO), it sets "Initiator Error," representing a login failure, as the return value for processing A (SP610), and terminates processing A.

Figure 7:
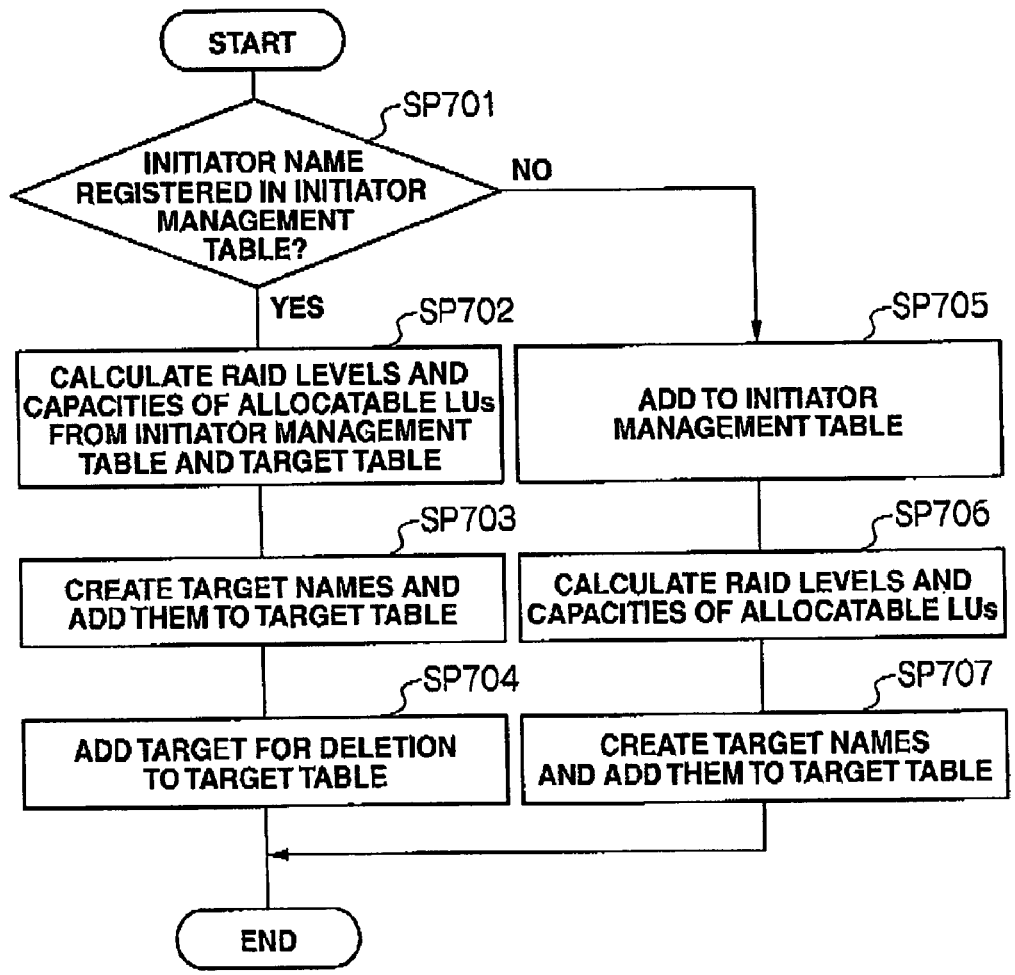
FIG. 7 is a flowchart showing processing B performed based on a target program in the first embodiment.

It the storage-side CPU 101 judges that the "Session Type" field value is neither "Discovery" (SP601: NO) nor "Normal" (SP602: NO), it sets "Initiator Error," representing a login failure, as the return value for the processing A (SP610), and terminates processing A FIG. 7 is a flowchart showing processing B performed by the storage-side CPU 101 by executing the target program 201. In FIG. 7, first, the storage-side CPU 101 judges whether or not the initiator name received as an argument is registered in the initiator management table 203 (SP701).

Then if the storage-side CPU 101 judges the initiator name as being registered in the initiator management table 203 (SP701: YES), it refers to the initiator management table 203 and the target table 202. The storage-side CPU 101 sets the maximum disk usage in the "MAXIMUM DISK USAGE" field 403 for the relevant initiator name minus the already-allocated disk usage in the relevant "DISK USAGE" field 305 as the allocatable disk usage.

The storage-side CPU 101, based on the allocatable disk usage, confirms the combinations of the RAID levels and capacities of one or more allocatable LUs (SP702). For example, two LUs are allocated to an initiator with the initiator name "initiator0," and if the disk usage for each of the LUs is 20 gigabytes, the storage-side CPU 101 will be able to provide LUs with a maximum of 40 gigabytes in a JBOD configuration, which is an ordinary configuration, not a RAID configuration, or LUs with 20 gigabytes in the RAID level 1 configuration if it receives iSCSI Login Request PDUs from the same initiator.

Next, the storage-side CPU 101 creates the target name for each of the combinations of the RAID levels and capacities for LUs obtained at the previous step SP702, and adds the created target names to the target table 202 (SP703). In this embodiment, as shown in FIG. 3, the letter string "iqn.init," the initiator number, the character "-," the LU capacity, the letter string "gb-," the RAID level, the letter string "-LU," and the LUN are combined in that order to create the target itself. The storage-side CPU 101 adds the targets created as described above to the target table 202.

In this embodiment, "1" are provided to the "ASSIGNED PORT" fields 303 for all the targets created as described above, and the corresponding "LUN" fields 304 and the "DISK USAGE" fields 305 are left vacant.

Subsequently, the storage-side CPU 101 adds to the target table 202 a target with a target name combining the letter string "iqn.init," the initiator number, the letter string "-delete," the letter string "-lu," and LUN in that order (hereinafter referred to as "target for deletion") for each of the LUs already provided with a "LUN" (SP704). For these targets created as described above, the "1" is stored in all the "ASSIGNED PORT" fields 303, and the "LUN" fields 304 and the "DISK USAGE" fields 305 are left vacant.

Meanwhile, at step SP701, the storage-side CPU 101, if the initiator name received as an argument is not registered in the initiator management table 203 (SP701: NO), first, provides an initiator number to the initiator name, and adds the initiator name received as an argument, the initiator number, and the maximum disk usage set in advance by an administrator to the initiator management table 203 (SP705).

Next, the storage-side CPU 101 calculates the combinations of RAID levels and capacities of one or more allocatable LUs, using the maximum disk usage in the "MAXIMUM DISK USAGE" field 403 for the newly provided initiator number as the allocatable disk usage, with reference to the initiator management table 203 (SP706). For example, if the storage-side CPU 101 receives an iSCSI Login DPU having the initiator name "initiator1" from a host computer 110 when no data for the initiator "initiator1" exists in the initiator management table 203, it can provide 80 gigabytes at a maximum in the JBOD configuration, and 40 gigabytes at a maximum in the RAID level 1 configuration.

Next, the storage-side CPU 101 creates the target name for each of the RAID level and capacity combinations for the LUs obtained at the previous step SP706, and adds the created target names to the target table 202 (SP707). The method for creating the target names is the same as explained at SP703, so the explanation will not be repeated.

Figure 8:
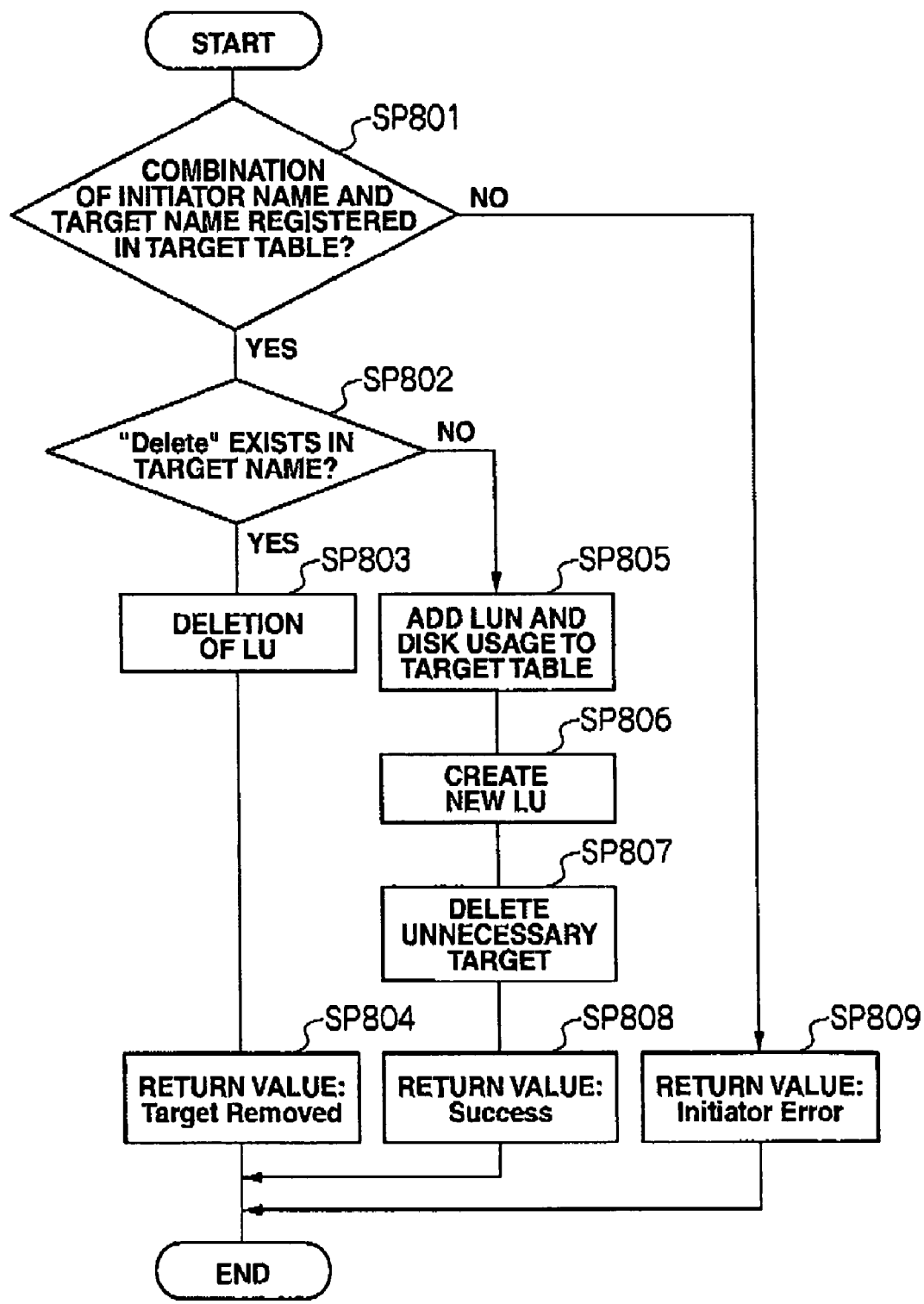
FIG. 8 is a flowchart showing processing C performed based on a target program in the first embodiment.

FIG. 8 is a flowchart showing processing C performed by the storage-side CPU 101 by execute the target program 201. In FIG. 8, first, the storage-side CPU 101 judges whether or not the combination of the initiator name and the target name received as arguments is registered in the target table 202 (SP801).

If the storage-side CPU 101 judges it as being registered in the target table 202 (SP801; YES), it then judges whether or not "delete" is included in the target name (SP802).

As a result of the judgment, if the storage-side CPU 101 judges "delete" as being included in the target name (SP802: YES), it reads that target name, and, referring to the target table 202, identifies the LU number for the LU to be deleted. The storage-side CPU 101, upon detection of the number corresponding to the identified LU number from the "LUN" fields 304, deletes the relevant row(s) from the target table 202 to delete the LU (SP803).

For example, if the number identified by the storage-side CPU 101 is "0," the storage-side CPU 101 confirms that the LU 0 is allocated to the relevant host computer 110, and it then deletes the row(s) with "0" stored in the "LUN" field 304 from the target table 202 to delete the LU 0.

Next, the storage-side CPU 101 sets "Target Removed," which indicates that there is no target for login, as the return value to indicate that the row(s) corresponding to the identified LU have been deleted (SP804), and terminates processing C.

Meanwhile, at step SP802, if the storage-side CPU 101 judges "delete" as not being included in the target name (SP802: NO), it reads the part of the target name letter string corresponding to the LU capacity information after the initiator number and the first "-." The storage-side CPU 101 recognizes the RAID level and capacity for the relevant LU, and referring to the target table 202, adds the relevant LUN and disk usage (SP805). Furthermore, the storage-side CPU 101 creates an LU with the RAID level and capacity added at step SP805 (SP806).

Next, the storage-side CPU 101, referring to the target table 202, deletes the created LU-related targets with their "LUN" fields 304 vacant, i.e., "-" (SP807), and sets "Success," which is a return value that represents the login success (SP808), and terminates processing C.

If the storage-side CPU 101 judges the combination of the initiator name and the target name received as arguments as not being registered in the target table 202 (SP801 NO), it sets "Initiator Error," which is a return value representing the login failure (SP809), and terminates processing C.

As explained above, the storage apparatus 100, upon receipt of an iSCSI Login command from a host computer 110, can send a response to allow login (SP503), and can also send a response including a letter string representing the processing that can be performed by the user on the storage apparatus (SP505).

The storage apparatus 100, upon receipt from a host computer 110 of a message whereby the start of the use of a specific target in the storage apparatus 100 can be expected (SP506), can perform the processing according to the target name (SP507).

The storage apparatus 100 can also create an LU according to the target name, and provide it to the relevant host computer 110.

(2) Second Embodiment

Next, in this embodiment, the operation where a storage apparatus 100A create new LU(s) formatted with a specific file system will be explained.

The configuration of a storage system 1A according to this embodiment is the same as that of the storage system 1 according to the first embodiment, except for memory 102A The parts of the operation of the storage apparatus 100A corresponding to the sequence shown in FIG. 5 and the processing A flowchart shown in FIG. 6 in the first embodiment will not be explained because they are the same as those for the first embodiment. This embodiment will be explained with regard to the points that are different from the first embodiment.

FIG. 9 shows a target table 202A according to the second embodiment. The target table 202A in FIG. 9 includes a letter string for the storage apparatus 100A to create new LU(s) formatted by a specific file system.

Processing B according to this embodiment is executed by the storage-side CPU 101 based on a target program 201A. Processing B explained in this embodiment is the same as processing B in the first embodiment with reference to FIG. 7, except for step SP703.

In the second embodiment, at the step (not shown) corresponding to step SP703 in FIG. 7, the storage-side CPU 101 creates a new target name, in addition to those explained in the first embodiment, combining the letter string "iqn.init," the initiator number, the character "-," the LU capacity, the letter string "gb-," the RAID level, the character "-," the file system name, the letter string "-LU," and the LUN in that order, and adds the created target name to the target table 202A. Here, a widely-used file system like "ntfs (NT File System)" or "ext3" will be set as the file system name.

Processing C explained in this embodiment is the same as processing C according to the first embodiment explained with reference to FIG. 8, except for step SP806. In the second embodiment, at the step (not shown) corresponding to step SP806 in FIG. 8, if a file system name is contained between the RAID level and the LUN in the target name letter string, the storage apparatus 100A writes the relevant file system to the LU.

Using the process described above, the host computer 110 can use the LU formatted with the specific file system in the storage apparatus 100 as a peripheral device.

(3) Third Embodiment

In this embodiment, the operation of a storage apparatus 100B to create a backup for an existing LU will be explained.

The configuration of a storage system according to the third embodiment is the same as that of the storage system 1 according to the first embodiment, except for memory 102B. The parts of the operation of the storage apparatus 100B corresponding to the sequence shown in FIG. 5 and the processing A flowchart shown in FIG. 6 in the first embodiment will not be explained because they are the same as those for the first embodiment. The third embodiment will be explained with regard to the points that are different from the first embodiment.

FIG. 10 shows a target table 202B according to the third embodiment. The target table 202B in FIG. 10 includes a letter string for the storage apparatus 100B to create a backup of an existing LU.

Processing B according to the third embodiment is performed by the storage-side CPU 101 based on a target program 201B. Processing B in this embodiment is the same as processing B explained with reference to FIG. 7 in the first embodiment, except for step SP703.

In the third embodiment, at the step corresponding to step SP703 in FIG. 7, the storage-side CPU 101 creates a new target name, in addition to those explained in the first embodiment, combining the letter string "iqn.init," the initiator number, the character "-," the letter string "backup," the letter string "-LU," and the LUN in that order, and adds the created target name to the target table 202B.

Figure 11:
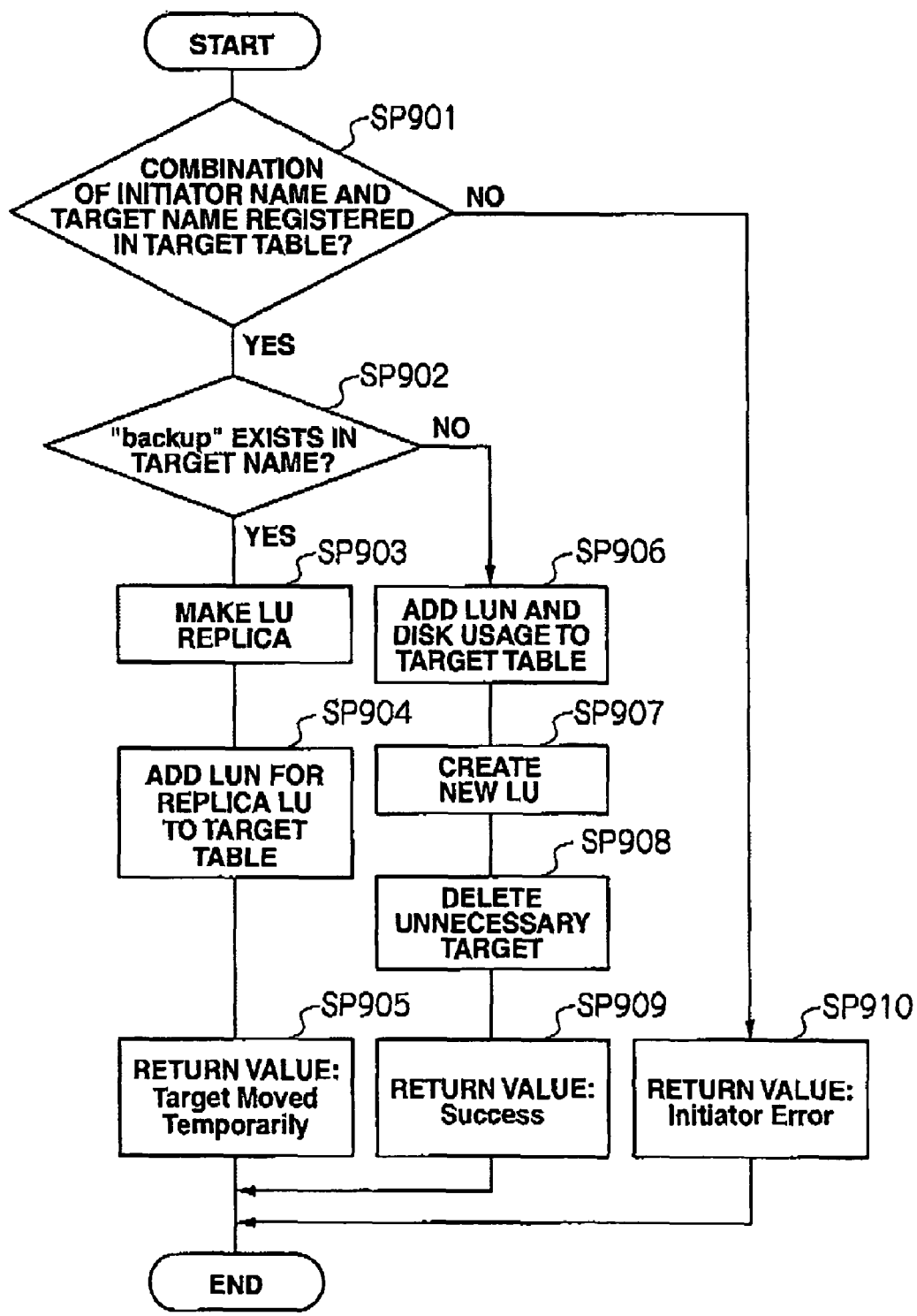
FIG. 11 is a flowchart showing processing C performed based on a target program in the third embodiment.

Processing C according to the third embodiment will be explained below. Processing C is also performed by the storage-side CPU 101 based on the target program 201B. More specifically, first, as shown in FIG. 11, the storage-side CPU 101 judges whether or not the combination of the initiator name and the target name received as arguments is registered in the target table 202B (SP901).

If the storage-side CPU 101 judges the initiator name and target name combination as being registered in the target table 202B (SP901: YES), then it judges whether or not the target name includes "backup" (SP902). If the storage-side CPU 101 judges the target name as including "backup," it reads the target name, identifies the LUN corresponding to the relevant LU from the target table 202, and creates a replica of the LU (SP903). Accordingly, the replica LU has the same RAID level, capacity and data as the LU.

Next, the storage-side CPU 101 adds the LUN and disk usage for the replica LU to the target table 202B (SP904). Then the storage-side CPU 101 sets the return value "Target Moved Temporarily," which represents that the target LU has been moved (SP905), and terminates processing C. The return value may be any return value that can be recognized by the host computers 110 as representing a non-ordinary login, and is not limited to "Target Moved Temporarily."

Processing at steps SP906 to SP910 will not be explained because it is the same as that at the aforementioned steps SP805 to SP809 in FIG. 8.

With the process described above, the host computers 110 can create backups for the LUs as needed.

(4) Fourth Embodiment

In this embodiment, the operation of a storage apparatus 100C to provide information relating to the settings for an existing initiator will be explained.

The configuration of a storage system 1C according to the fourth embodiment is the same as that of the storage system 1 according to the first embodiment, except for memory 102C. The parts of the operation of the storage apparatus 100C corresponding to the sequence shown in FIG. 5 and the processing A flowchart shown in FIG. 6 in the first embodiment will not be explained because they are the same as those for the first embodiment. The fourth embodiment will be explained only with regard to the points that are different from the first embodiment.

FIG. 12 shows a target table 202C according to the fourth embodiment. The target table 202C in FIG. 12 includes a letter string for providing setting information relating to an existing initiator. Processing B according to this embodiment is performed by the storage-side CPU 101 based on a target program 201C. Processing B in this embodiment is the same as processing B explained with reference to FIG. 7 in the first embodiment, except for step SP703.

In the fourth embodiment, at the step corresponding to SP703 in FIG. 7, a new target name, in addition to those explained in the first embodiment, combining the letter string "iqn.init," the initiator number, the character "-," the letter string "showconfig," the character "-," and the file system name in that order is created, and added to the target table 202C.

Processing C in the fourth embodiment will be explained below. Processing C according to this embodiment is also performed by the storage-side CPU 101 based on the target program 201C.

Figure 13:
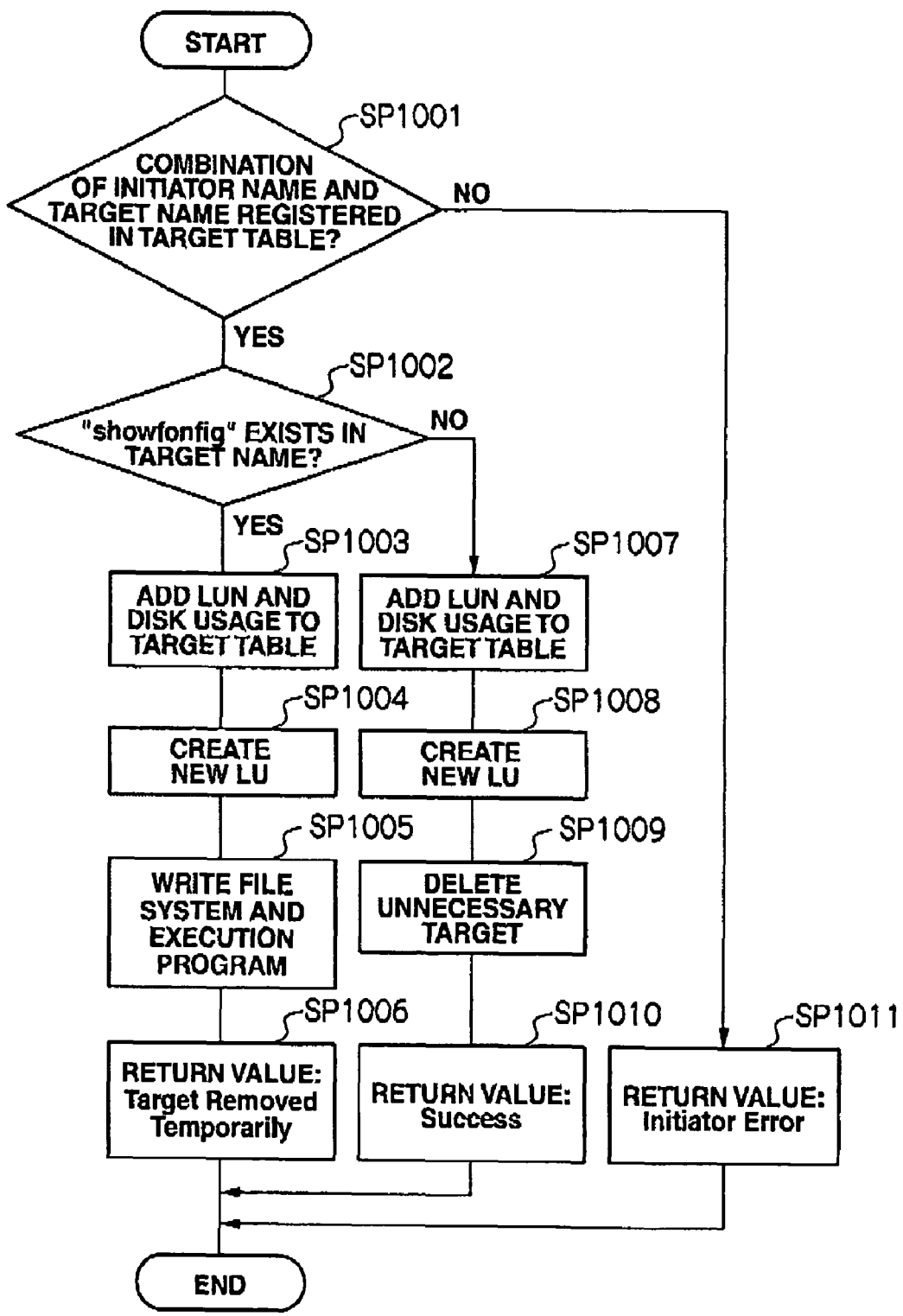
FIG. 13 is a flowchart showing processing C performed based on a target program in the fourth embodiment.

More specifically, as shown in FIG. 13, the storage-side CPU 101 judges whether or not the combination of the initiator and the target name received as arguments is registered in the target table 202C (SP1001).

If the storage-side CPU 101 judges the initiator name and target name combination as being registered in the target table 202C (SP1001: YES), then it judges whether or not the target name includes "showconfig" (SP1002).

If the storage-side CPU 101 judges the target name as including "showconfig" (SP1002: YES), it reads the target name, and adds the LUN and disk usage for the relevant LU to the target table 202C (SP1003) to create a new LU and allocate it to the relevant host (SP1004). The allocated LU may be a previously unallocated one. The disk usage only has to be a capacity that allows the later-described execution program to be recorded.

The storage-side CPU 101 identifies the file system name when it reads the target name, and writes the relevant file system to the LU, and then writes an execution program that can be executed on a widely-used OS like Windows (registered trademark), or Linux, to the LU (SP1005). The execution program is one that, upon being executed on a host computer 110, displays on an output device of the host computer 110, such as a display, the combinations of the target names, the assigned ports, the LUNs and disk usages for the targets assigned to the relevant initiator. The storage-side CPU 101 sets "Target Moved Temporarily" as the return value (SP1006), and terminates processing C.

Processing at steps SP1007 to SP1011 will not be explained because it is the same as the processing at the aforementioned steps SP805 to SP809 in FIG. 8.

Using the above-described process, a user can confirm information set in the storage apparatus 100C via a host computer 110 as needed.

(5) Fifth Embodiment

In this embodiment, the operation of a storage system 1D when a storage apparatus 100D changes the password for a specific initiator will be explained.

The configuration of the storage system 1D according to the fifth embodiment is the same as that of the storage system 1 according to the first embodiment, except for memory 102D. The parts of the operation of the storage apparatus 100D corresponding to the sequence shown in FIG. 5 and the processing A flowchart shown in FIG. 6 in the first embodiment will not be explained because they are the same as those for the first embodiment. The fourth embodiment will be explained with regard to the points that are different from the first embodiment.

FIG. 14 shows a target table 202D according to the fifth embodiment. The target table 202D in FIG. 14 includes a letter string for the storage apparatus 100D to change the password for a specific initiator.

Figure 15:
FIG. 15 shows an initiator management table according to the fifth embodiment.

FIG. 15 shows an initiator management table 203D according to the fifth embodiment. The initiator management table 203D in FIG. 15 has "PASSWORD" fields 404, in addition to the "INITIATOR NUMBER" fields 401, "INITIATOR NAME" fields 402, and "MAXIMUM DISK USAGE" fields 403 described with reference to FIG. 4.

Each "PASSWORD" field 404 stores the password set by a user for the relevant initiator.

Processing B according to the fifth embodiment is performed by the storage-side CPU 101 based on a target program 201D. Processing B according to the fourth embodiment is the same as processing B according to the first embodiment explained with reference to FIG. 7, except for step SP703.

In the fifth embodiment, at the step corresponding to step SP703 in FIG. 7, a new target name, in addition to those explained in the first embodiment, combining the letter string "iqn.init," the initiator number, the character "-," the letter string "changepassword," the character "-," and the file system name in that order is created and added to the target table 202D.

Processing C according to the fifth embodiment will be explained below. Processing C according to this embodiment is also performed by the storage-side CPU 101 based on the target program 201D.

Figure 16:
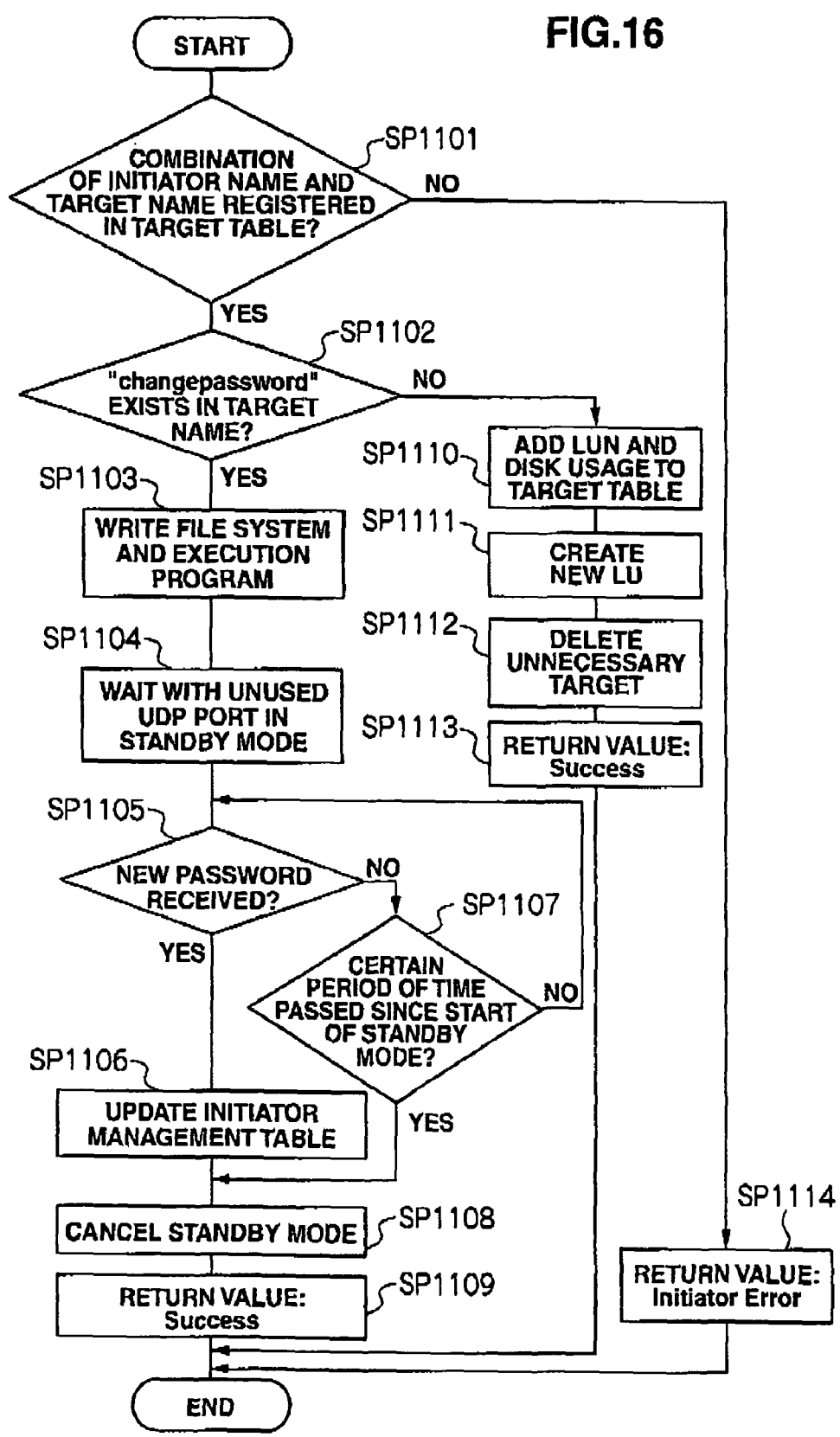
FIG. 16 is a flowchart showing processing C performed based on a target program in the fifth embodiment.

More specifically, as shown in FIG. 16, the storage-side CPU 101 judges whether or not the combination of the initiator and the target name received as arguments is registered in the target table 202D (SP1101).

If the storage-side CPU 101 judges the initiator name and target name combination as being registered in the target table 202D (SP1101), then it judges whether or not the target name includes "changepassword" (SP1102).

If the storage-side CPU 101 judges the target name as including "changepassword" (SP1102: YES), it identifies the relevant file system from the read target name and writes it to the relevant LU, and then writes an execution program that can be executed on a widely-used program such as Windows (registered trademark) or Linux (SP1103), to the LU.

Next, the storage-side CPU 101, following the execution program, puts one of the unused UDP ports in standby mode (SP1104).

A user can input a new password by executing the above execution program via a host computer 110. Upon the users input of the new password, the host computer 110 sends the password to the storage apparatus 100D.

The storage-side CPU 101 judges whether or not it has received the new password (SP1105). If the storage-side CPU 101 judges the new password as received (SP1105: YES), it updates the initiator management table 203D (SP1106), and cancels the standby mode of the UPD port (SP1108).

Meanwhile, if the storage-side CPU 101 judges the new password as not being received (SP1105: NO), then it judges whether or not a certain period of time has passed from the start of the standby mode (SP1107). If the storage-side CPU 101 judges a certain period of time as not having passed from the start of the standby mode (SP1107: NO), it returns to step SP1105.

If the storage-side CPU 101 judges a certain period of time as having passed from the start of the standby mode (SP1107:

YES), it cancels the standby mode of the UDP port (SP1108). The storage-side CPU 101 sets "Success" as the return value (SP1109), and terminates processing C.

The processing at steps SP1110 to SP1114 will not be explained because it is the same as the processing at the aforementioned steps SP805 to SP809 in FIG. 8.

Using the above-described process, a user can change a password set in the storage apparatus 100D for himself/herself as needed.

(6) Sixth Embodiment

In this embodiment, the operation of a storage system 1E when a storage apparatus 100E creates LU pairs conducts resynchronization or restoration of data between LUs forming a pair, or changes the states of LUs forming a pair will be explained. In this embodiment, two LUs can form a pair, and the LU pair is composed of a primary volume and a secondary volume.

The configuration of the storage system 1E according to the sixth embodiment is the same as that of the storage system 1 according to the first embodiment, except for memory 102E. The parts of the operation of the storage apparatus 100E corresponding to the sequence shown in FIG. 5 and the processing A flowchart shown in FIG. 6 in the first embodiment will not be explained because they are the same as those for the first embodiment. The sixth embodiment will be explained with regard to the points that are different from the first embodiment.

Figure 17:
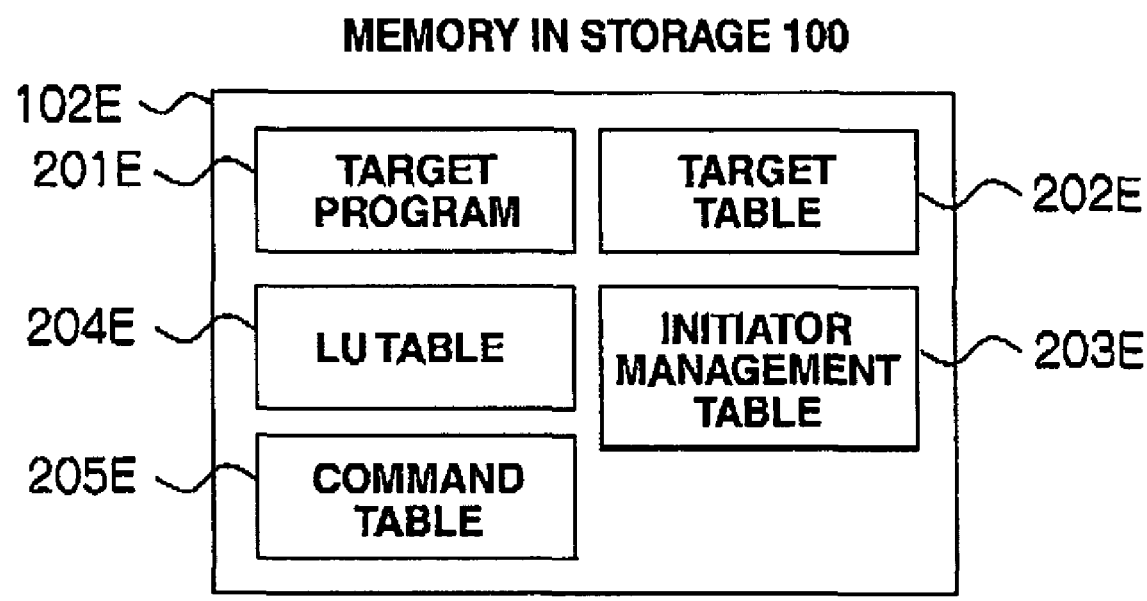
FIG. 17 is a block diagram showing the inside of memory according to a sixth embodiment.

FIG. 17 shows the memory 102E according to the sixth embodiment. The memory 102E stores a target program 201E, a target table 202E, an initiator management table 203E, and an LU (management) table 204E.

The target program 201E is a program for sending/receiving iSCSI PDUs (Protocol Data Units) according to the iSCSI standards to/from the initiator programs 111 operating on the host computers 110. The target program 201E creates LU pairs, conducts resynchronization or restoration of data between LUs forming a pair, or changes the status of LUs forming a pair upon receipt of iSCSI Login PDUs according to processing performed by the initiator program 111 in the host-side CPU 112. The details of this operation will be explained later with reference to FIGS. 18 to 27.

When the target program 201E receives a request for write to a primary volume in the "PAIR" status explained later from the host computer 110, it writes data to a primary volume and writes the same data to a corresponding secondary volume simultaneously. Also, when the target program 201E receives a write request to a primary volume in the "PAIR" or "COPY" status explained later from the host computer 110, it does not perform write to the secondary volume, and sends a response indicating an error to the host computer 110. The target table 202E and the initiator management table 203E are the same as those in the first embodiment.

The LU table 204E is a table having "INITIATOR NAME" fields 1801, "LUN" fields 1802, "P/S" fields 1803, "STATUS" fields 1804, "ELAPSED TIME" fields 1805, "PERCENTAGE OF COMPLETION" fields 1806, "THROUGHPUT" fields 1807, "REMAINING TIME" fields 1808, and "PAIR LU" fields 1809, as shown in FIG. 18.

Each "INITIATOR NAME" field 1801 stores a name for identifying an iSCSI initiator. Each "LUN" field 1802 stores a number for identifying an LU. Each "P/S" field 1803 stores a character "P" indicating a primary volume or a character "S" indicating a secondary volume regarding each LU forming a pair. Each "STATUS" field 1804 stores information about the LU status.

"SMPL" indicates a status in which an LU do not have a counterpart LU. "PAIR" indicates a status in which: data in an LU is in synchronization with data in a counterpart LU; and the same data is written to both LUs. "SUS" indicates a status in which: data synchronization is under suspension between volumes forming a pair; and write is performed only to a primary volume. "COPY" indicates a status in which data copy is being performed between primary and secondary volumes.

Each "ELAPSED TIME" field 1805 stores an elapsed time for data copy between LUs in the "COPY" status. Each "PERCENTAGE OF COMPLETION" 1806 stores a percentage of completion for data copy between LUs in the "COPY" status. Each "THROUGHPUT" field 1807 stores a throughput for data copy between LUs in the "COPY" status. Each "REMAINING TIME" field 1808 stores a remaining time for data copy between LUs in the "COPY" status. Each "PAIR LU" field 1809 stores a number for identifying a counterpart LU.

A command table 205E is a table having "STATUS" fields 1901, "PAIRCRAETE" fields 1902, "SPLIT" fields 1903, "SUSPEND" fields 1904, "RESYNC" fields 1905, "RESTORE" fields 1906, and "ABORT" fields 1907, as shown in FIG. 19.

"PAIRCREATE" is a command for creating an LU serving as a secondary volume with respect to an LU in the "SMPL" status serving as a primary volume. "SPLIT" is a command for canceling an LU pair. "SUSPEND" is a command for changing the LU pair status from "PAIR" to "SUS" and suspending write to a secondary volume.

"RESYNC" is a command for resynchronizing data in a primary volume with data in a secondary volume. "RESTORE" is a command for restoring data in a secondary volume in a primary volume. "ABORT" is a command for aborting data resynchronization or restoration in execution.

"1" in each field shows that a command is executable in the relevant status, and "0" in each field shows that a command is non-executable in the relevant status. For example, in FIG. 19, an executable command for an LU in the "SMPL" status is only "PAIRCREATE."

Processing B explained in this embodiment is the same as processing B in the first embodiment with reference to FIG. 7, except for step SP703. The target table 202E in this embodiment has the same configuration as the target table 202D in FIG. 14.

Figure 20:
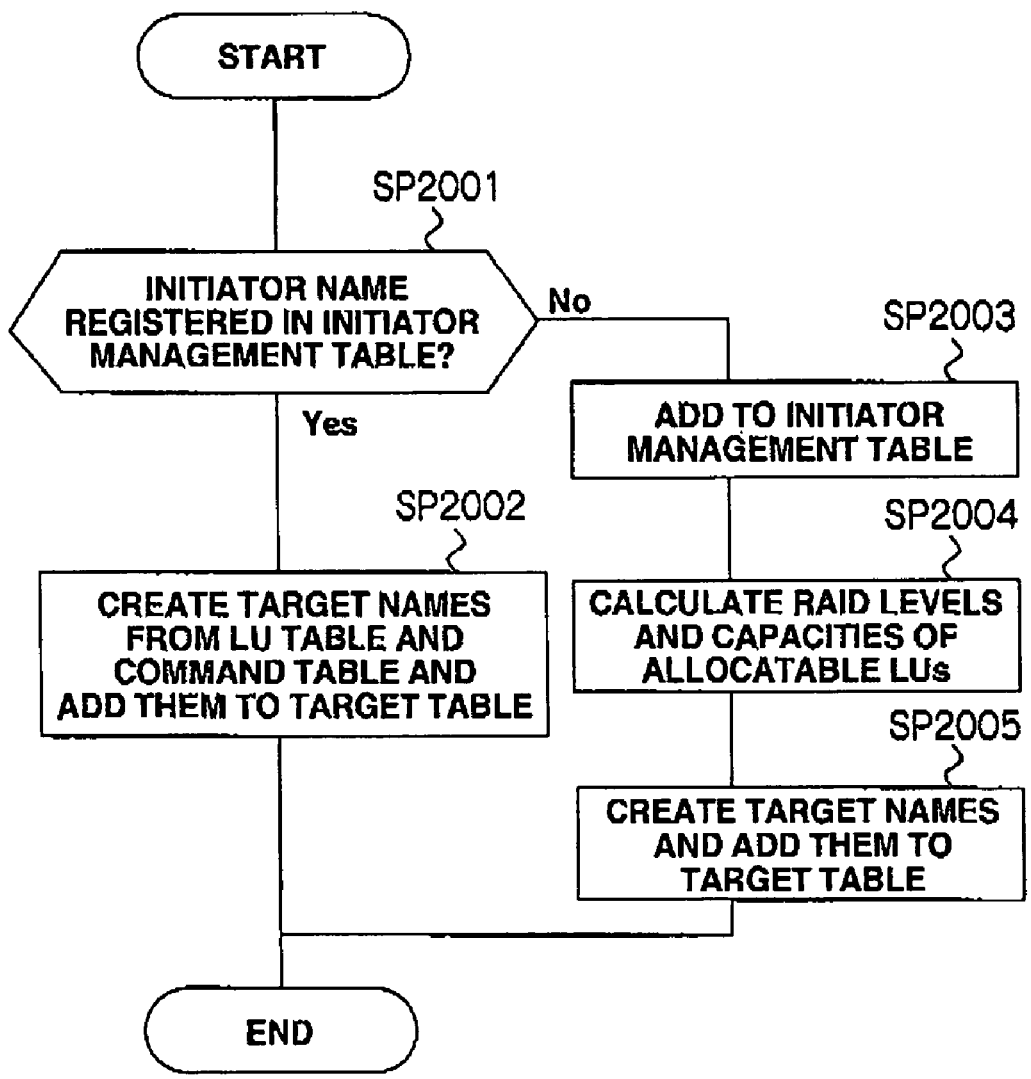
FIG. 20 is a flowchart showing processing B performed based on a target program in the sixth embodiment.

FIG. 20 shows processing B performed by the target program 201E upon receipt of a discovery session login. Processing B explained in this embodiment is the same as processing B in the first embodiment with reference to FIG. 7, except for step SP2002 (steps SP2003 to SP2005 are the same as steps SP703 to SP707).

In step SP2002, executable commands for each LU are determined by referring to the LU table 204E and the command table 205E, and accordingly, target names are created. For example, an executable command for the LU with the LUN "0" for the initiator with the initiator name "initiator0" is only "PAIRCREATE," and therefore, the target with the target name "iqn.init000-lu0paircreate" is added to the target table 202E. In addition, the target program 201E updates the target table 202E to include the status of each LU, elapsed time, percentage of completion, throughput, and remaining time at the time in the relevant target name.

For example, the target program 201E creates a target name (volume information) obtained by adding "paircreate" serving as information relating to processing executable depending on the LU status [processing, the possibility of which depends on the LU status, to "iqn.init000-lu0-" serving as LU function information. Also, the target program 201E creates, as response information for the host computer 110, a target name (volume information) obtained by adding internal status information, which shows the real-time LU internal status, like [status of each LU, elapsed time, percentage of completion, throughput, remaining time]. The target program 201E updates the target table 202 with the above created target names.

FIG. 21 shows an example of the target table 202E in this embodiment. The target name "iqn.init000-lu5:p-copy-00:01:42-38.2percent-233mbps-00:02:45" indicates the LU with the LUN "5" being a primary volume; "COPY" for the status; 1 minute 42 seconds for the copy elapsed time; 38.2% for the percentage of completion; 233 megabytes per second for the throughput; and 2 minutes and 45 seconds for the remaining time. The initiator program 111 operating on the host computer 110 receives the target names as a response to the discovery session login (SP505).

The operation of the target program 201E where the end of the target name serving as a destination for the iSCSI Login (Normal Session) received by the storage-side CPU 101 from the host-side CPU 112 in step SP506 in FIG. 5 is a letter string showing a command in the command table 205E will be explained below.

Figure 22:
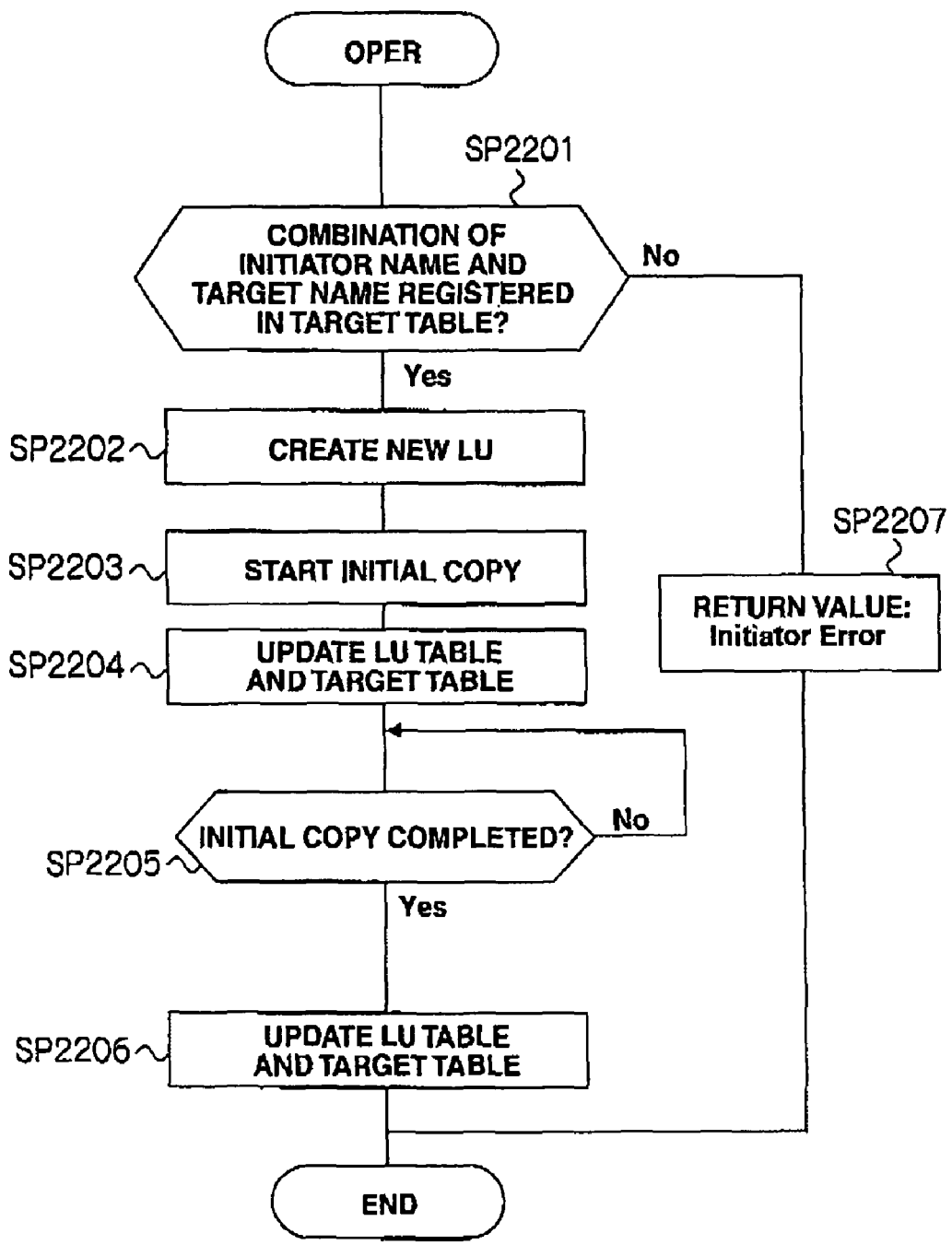
FIG. 22 is a flowchart showing processing performed upon receipt of "PAIRCREATE" in the sixth embodiment.

FIG. 22 shows the operation of the target program 201E where the end portion of the login destination target name is "paircreate." When the combination of the initiator name and the target name included in the iSCSI login request is registered in the target table 202E (SP2201: YES), the target program 201E creates a new LU having the same capacity as that for the relevant LU (SP2202), starts initial copy (SP2203), and updates the LU table 204E and the target table 202E to set "COPY" for the status of each of the LUs with the former LU serving as a primary volume and the latter LU serving as a secondary volume (SP2204). After the completion of the initial copy (SP2205: YES), the target program 201E updates the LU table 204E and the target table 202E to set "PAIR" for the status of each of the LUs (SP2206).

Figure 23:
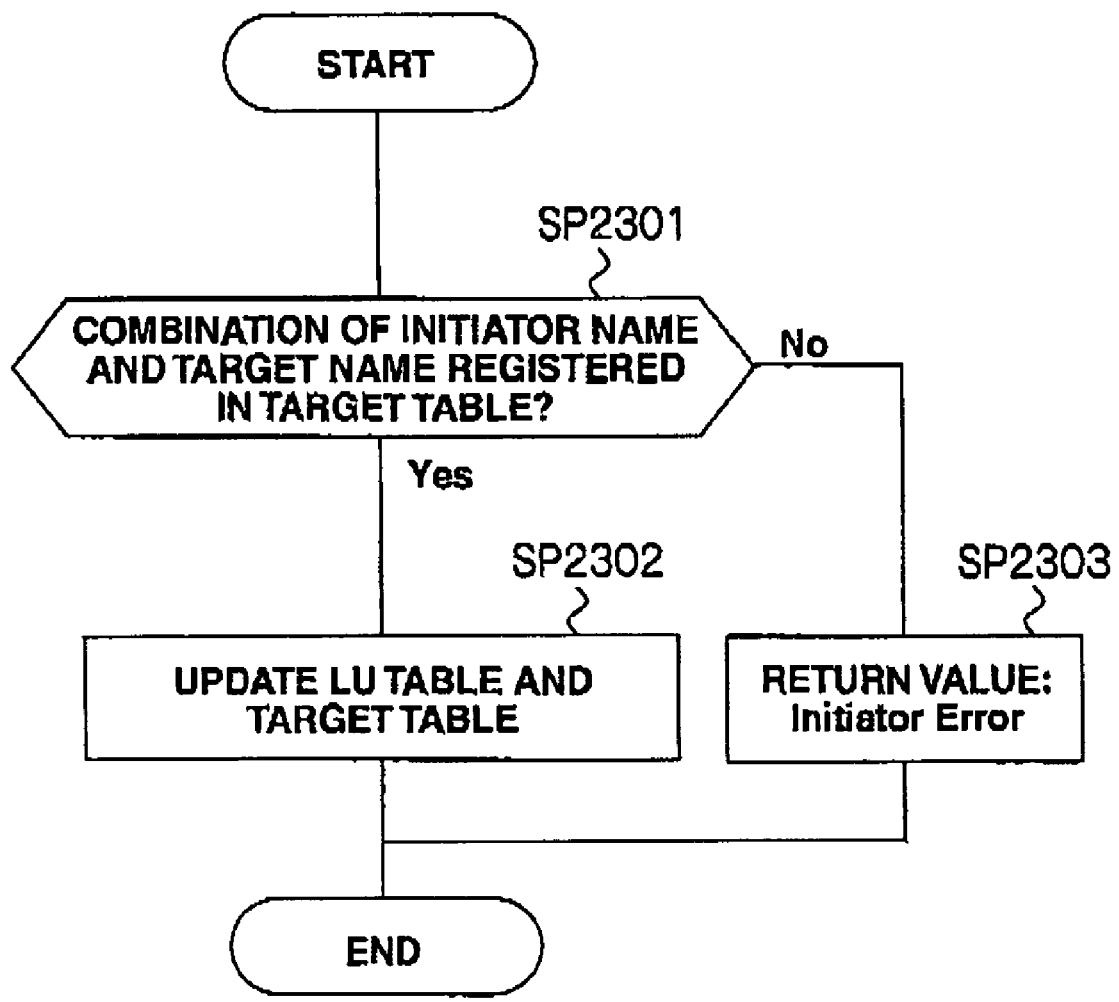
FIG. 23 is a flowchart showing processing performed upon receipt of "SPLIT" in the sixth embodiment.

FIG. 23 shows the operation of the target program 201E where the end portion of the login destination target name is "split." When the combination of the initiator name and the target name included in the iSCSI login request is registered in the target table 202E (SP2301: YES), the target program 201E cancels the relevant LU pair, and updates the LU table 204E and the target table 202E to set "SMPL" for the status of each of the LUs (SP2302).

Figure 24:
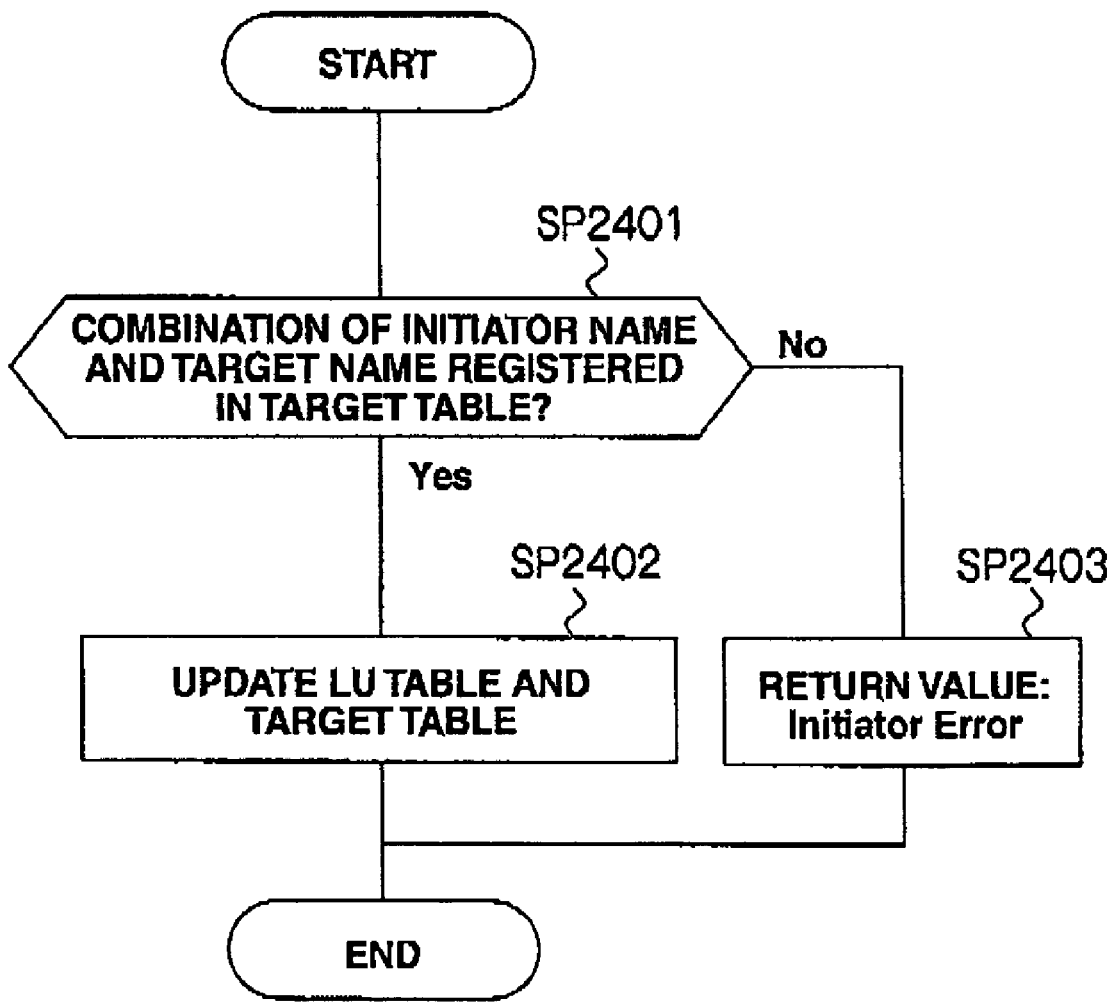
FIG. 24 is a flowchart showing processing performed upon receipt of "SUSPEND" in the sixth embodiment.

FIG. 24 shows the operation of the target program 201E where the end portion of the login destination target name is "suspend." When the combination of the initiator name and the target name included in the iSCSI login request is registered in the target table 202E (SP2401: YES), the target program 201E updates the LU table 204E and the target table 202E to set "SUS" for the status of each of the LUs in the relevant pair (SP2402).

Figure 25:
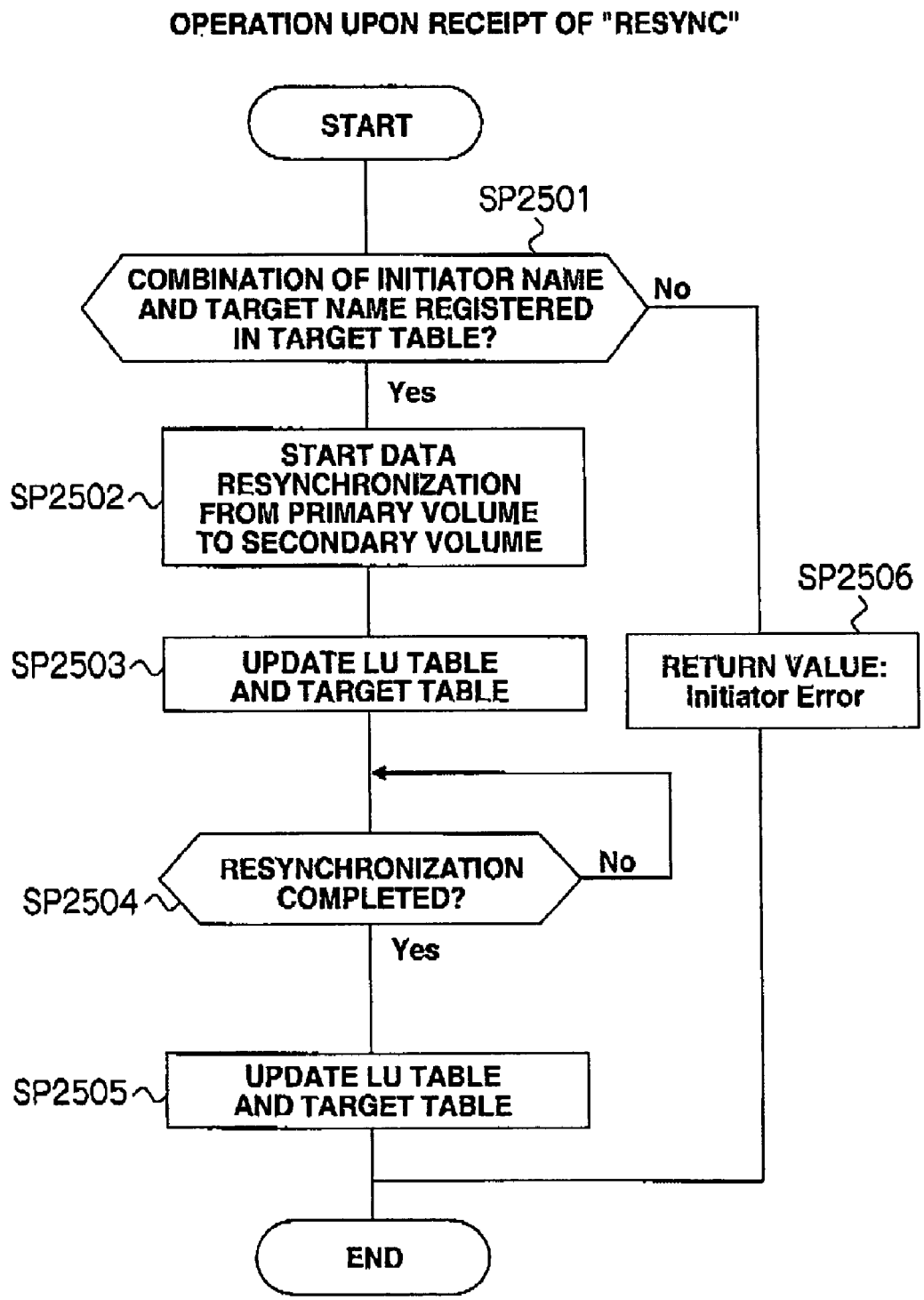
FIG. 25 is a flowchart showing processing performed upon receipt of "RESYNC" in the sixth embodiment.

FIG. 25 shows the operation of the target program 201E where the end portion of the login destination target name is "resync." When the combination of the initiator name and the target name included in the iSCSI login request is registered in the target table 202E (SP2501: YES), the target program 201E starts data resynchronizabon from the relevant primary volume to the relevant secondary volume (SP2502), and updates the LU table 204E and the target table 202E to set "COPY" for the status of each of the LUs (SP2503). After the completion of the resynchronization (SP2504: YES), the target program 201E updates the LU table 204E and the target table 202E to set "SUS" for the status of each of the LUs (SP2505).

Figure 26:
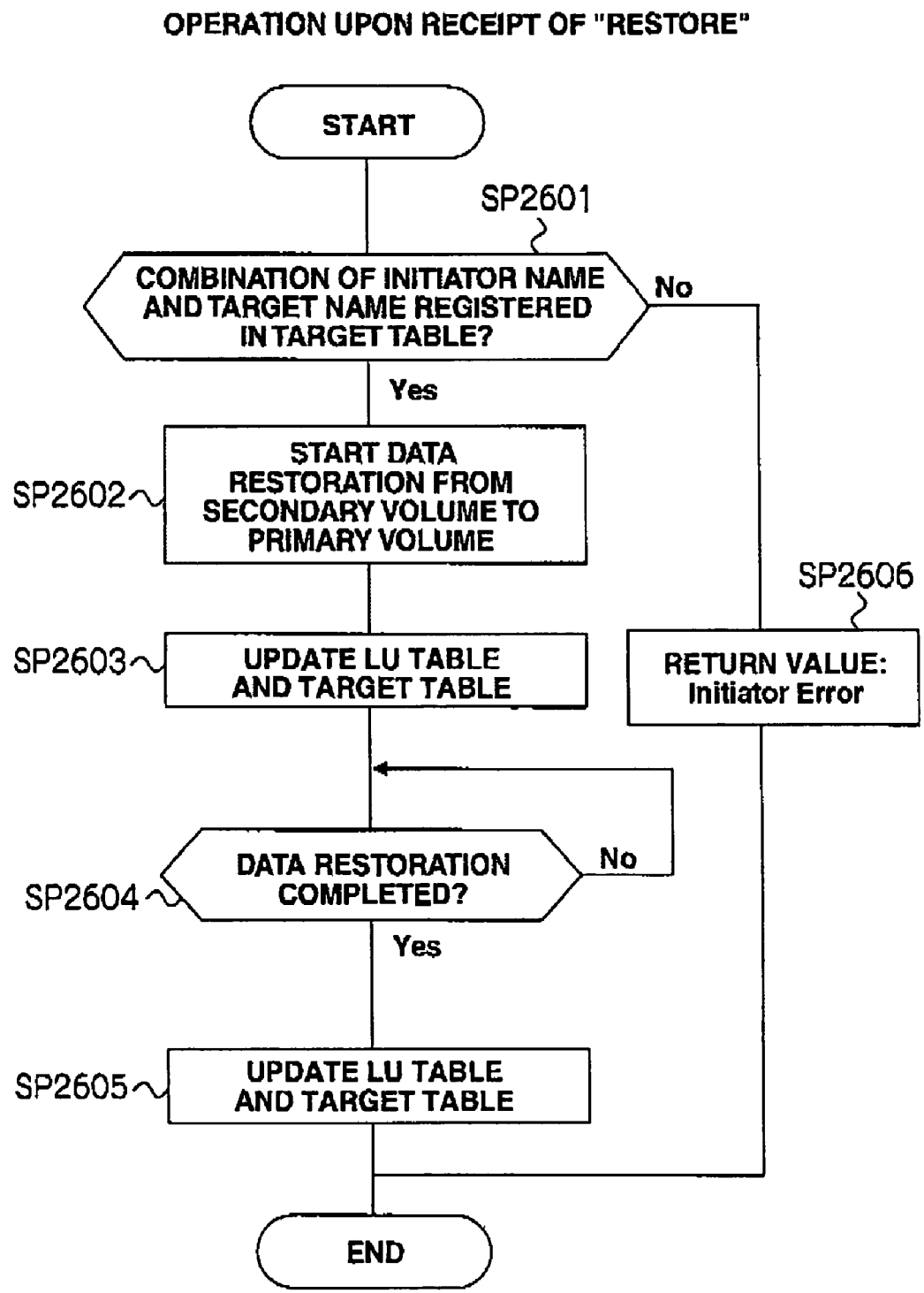
FIG. 26 is a flowchart showing processing performed upon receipt of "RESTORE" in the sixth embodiment.

FIG. 26 shows the operation of the target program 201E where the end portion of the login destination target name is "restore." When the combination of the initiator name and the target name included in the iSCSI login request is registered in the target table 202E (SP2601: YES), the target program 201E starts data restoration from the relevant secondary volume to the relevant primary volume (SP2602), and updates the LU table 204E and the target table 202E to set "COPY" for the status of each of the LUs (SP2603). After the completion of the data restoration (SP2604: YES), the target program 201E updates the LU table 204E and the target table 202E to set "SUS" for the status of each of the LUs (SP2605).

Figure 27:
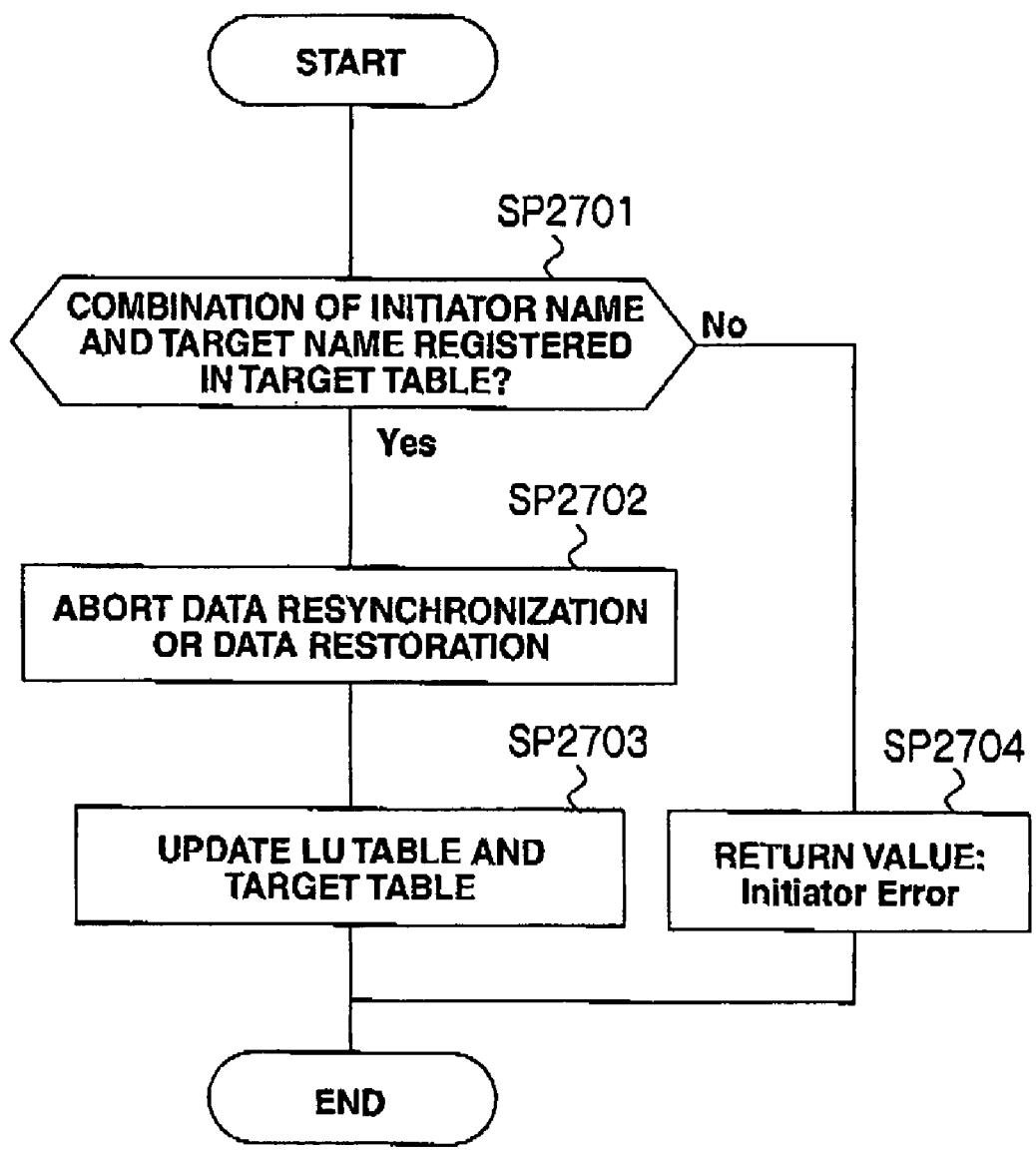
FIG. 27 is a flowchart showing processing performed upon receipt of "ABORT" in the sixth embodiment.

FIG. 27 shows the operation of the target program 201E where the end portion of the login destination target name is a letter string following "abort." When the combination of the initiator name and the target name included in the iSCSI login request is registered in the target table 202E (SP2701: YES), the target program 201E aborts data resynchronization or data restoration between the relevant LUs (SP2702), and updates the LU table 204E and the target table 202E to set "SUS" for the status of each of the LUs (SP2703).

Note that the letter string following "abort" at the end of the target name indicates the elapsed time, percentage of completion, throughput, and remaining time for the data resynchronization or data restoration between the relevant volumes, and a user can judge whether or not the data resynchronization or data restoration should be aborted after confirming the above information.

In the above-described embodiment, a target name for a single iSCSI target shows the command operation or status for the single LU. However, an embodiment may be employed in which a target name for a single iSCSI target shows the command operation or status for plural LUs. In this case, the invention can be implemented so that, e.g., the target with the target name "iqn.init000-lu1-lu3split" indicates a target for cancelling a pair of the LU with LUN 1 and the LU with LUN 3.

As described above, a user can perform backup/restoration on an LU basis, monitor the LU internal status that shows, the progress of the backup/restoration, throughput, etc., and understand executable operations for each LU using only standard iSCSI initiators and without using management software particular to a storage product.

(7) Other Embodiments

The above-described embodiments relate to the case where a management unit that manages information relating to the logical volumes allocated and not allocated to the host computers 110 as volume information (target names) consists of memory 102 and a target table 202; an identification unit that identifies necessary volume information based on a command from a host computer 110 consists of a CPU 101 and a target program 201; and an execution unit that executes, based on the necessary volume information identified by the identification unit, predetermined processing on a logical volume according to the function information relating to the logical volume included in that necessary volume information consists of the CPU 101 and the target program 201. However, the present invention is not limited to that case, and the management unit, the identification unit, and the execution unit may be separate hardware devices.

The present invention can be applied to a storage system having one or more storage apparatuses, or a broad range of storage systems with other configurations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage system comprising:

a host computer including one or more initiator modules; and a storage device that provides the host computer with a plurality of logical volumes each including a storage area from which data can be read and to which data can be written the logical volumes including one or more pairs of logical volumes each having a primary volume and a secondary volume, the storage device including a controller component and a memory component, the memory component including one or more target modules, a target management table, an initiator management table, and a logical volume management table, the one or more target modules establishing the one or more pairs of logical volumes and performing resynchronization and data restoration operations between the primary volumes and secondary volumes of the one or more pairs of logical volumes, the target management table providing a set of associations between a first set of initiator names each identifying one of the initiator modules, a set of target names each identifying one of the logical volumes and each including a set of volume information related to the identified logical volume, and a disk usage capacity parameter for each of the initiator modules of each of the logical volumes that are allocated to the initiator module, the initiator management table providing a second set of initiator names each identifying one of the initiator modules and a maximum disk usage parameter for each initiator module identified in the second set of initiator names, the logical volume management table providing a third set of initiator names each identifying one of the initiator modules, a set of logical volume identifiers each identifying one of the logical volumes, and a set of pair status parameters and a set of data copy status parameters for each of the logical volumes identified in the set of logical volume identifiers, wherein the controller component operates to process a communication message transmitted to the one or more target modules from the one or more initiator modules according to Internet Small Computer Systems Interface (iSCSI) standards, wherein if the communication message is a discovery session request and if the discovery session request includes an initiator name argument that corresponds to one of the initiator names included in the initiator management table, the controller component operates to:

update the maximum disk usage parameter for the initiator module identified by the corresponding initiator name in the initiator management table by subtracting the sum of the disk usage capacity parameters of each of the logical volumes that are allocated to the identified initiator module in the target management table from the maximum disk usage parameter for the identified initiator module, confirm a combination of a Redundant Array of Inexpensive/Independent Disks (RAID) level and an allocatable disk usage capacity parameter for each of the logical volumes that are allocatable to the identified initiator module according to the updated maximum disk usage parameter for the identified initiator module, add an association having a target name that identifies a target for each of the logical volumes that are allocatable to the identified initiator module in the set of associations, to create an association having a target name identifying a target for deletion for each of the logical volumes that are allocated to one of the one or more logical volumes in the set of associations, add an association having a target name that identifies a target for creating a secondary pair volume for each of the logical volumes that are allocatable to the identified initiator module in the set of associations, add an association having a target name that identifies a pair status for each of the logical volumes that are allocatable to the identified initiator module in the set of associations according to the set of pair status parameters for the logical volume in the logical volume management table, and add an association having a target name that identifies a data copy status for each of the logical volumes that are allocatable to the identified initiator module in the set of associations according to the set of data copy status parameters for the logical volume in the logical volume management table, wherein if the communication message is a discovery session request and if the discovery session request includes an initiator name argument that does not correspond to one of the initiator modules described in the set of associations, the controller component operates to:

add an initiator name corresponding to the initiator name argument to the second set of initiator names and a maximum disk usage parameter for an initiator module identified by the added initiator name in the initiator management table, calculate a combination of a RAID level and an allocatable disk usage capacity parameter for each of the logical volumes that are allocatable to the identified initiator module according to the updated maximum disk usage parameter for the identified initiator module, and add an association having a target name that identifies a target for each of the logical volumes that are allocatable to the identified initiator module in the set of associations, wherein if the communication message is a normal session request, if the normal session request includes an initiator name argument and a target name argument that correspond to the initiator name and the target name of an association in the set of associations, and if the target name corresponding to the target name argument identifies a target for deletion, the controller component operates to:

delete each association in the set of associations that includes a target name identifying the same logical volume identified by the target name corresponding to the target name argument, and wherein if the communication message is a normal session request, if the normal session request includes an initiator name argument and a target name argument that correspond to the initiator name and the target name of an association in the set of associations, and if the target name corresponding to the target name argument does not identify a target for deletion, the controller component operates to:

allocate the logical volume identified by the target name corresponding to the target name argument to the initiator module identified by the initiator name corresponding to the initiator name argument, set the disk usage capacity parameter of the identified logical volume that is allocated to the identified initiator module according to the RAID level and the allocatable disk usage capacity parameter of the identified logical volume specified by the target name corresponding to the target name argument, and delete each association in the set of associations that includes a target name identifying the same logical volume identified by the target name corresponding to the target name argument that is not allocated to one of the initiator modules.

2. The storage system according to claim 1, wherein the controller component creates, as response information for the host computer, volume information that includes information regarding processing that is executable by the one or more target modules depending on the set of pair status parameters in the logical volume management table for a first logical volume of the plurality of logical volumes allocated to the host computer.

3. The storage system according to claim 1, wherein the controller component creates, as response information for the host computer, volume information that includes information regarding the set of data copy status parameters in the logical volume management table for a first logical volume of the plurality of logical volumes allocated to the host computer.

4. A method for managing a storage system including a host computer including one or more initiator modules, and a storage device that provides the host computer with a plurality of logical volumes each including a storage area from which data can be read and to which data can be written the storage device including a memory component that includes one or more target modules, a target management table, and an initiator management table, and a logical volume management table, the one or more target modules establishing the one or more pairs of logical volumes and performing resynchronization and data restoration operations between the primary volumes and secondary volumes of the one or more pairs of logical volumes, the target management table providing a set of associations between a first set of initiator names each identifying one of the initiator modules, a set of target names each identifying one of the logical volumes and each including a set of volume information related to the identified logical volume, and a disk usage capacity parameter for each of the initiator modules of each of the logical volumes that are allocated to the initiator module, the initiator management table providing a second set of initiator names each identifying one of the initiator modules and a maximum disk usage parameter for each initiator module identified in the second set of initiator names, the logical volume management table providing a third set of initiator names each identifying one of the initiator modules, a set of logical volume identifiers each identifying one of the logical volumes, and a set of pair status parameters and a set of data copy status parameters for each of the logical volumes identified in the set of logical volume identifiers, the method comprising:

processing a communication message transmitted to the one or more target modules from the one or more initiator modules according to Internet Small Computer Systems Interface (iSCSI) standards;

if the communication message is a discovery session request and if the discovery session request includes an initiator name argument that corresponds to one of the initiator names included in the initiator management table:

updating the maximum disk usage parameter for the initiator module identified by the corresponding initiator name in the initiator management table by subtracting the sum of the disk usage capacity parameters of each of the logical volumes that are allocated to the identified initiator module in the target management table from the maximum disk usage parameter for the identified initiator module, confirming a combination of a Redundant Array of Inexpensive/Independent Disks (RAID) level and an allocatable disk usage capacity parameter for each of the logical volumes that are allocatable to the identified initiator module according to the updated maximum disk usage parameter for the identified initiator module, adding an association having a target name that identifies a target for each of the logical volumes that are allocatable to the identified initiator module in the set of associations, creating an association having a target name identifying a target for deletion for each of the logical volumes that are allocated to one of the one or more logical volumes in the set of associations, adding an association having a target name that identifies a target for creating a secondary pair volume for each of the logical volumes that are allocatable to the identified initiator module in the set of associations, adding an association having a target name that identifies a pair status for each of the logical volumes that are allocatable to the identified initiator module in the set of associations according to the set of pair status parameters for the logical volume in the logical volume management table, and adding an association having a target name that identifies a data copy status for each of the logical volumes that are allocatable to the identified initiator module in the set of associations according to the set of data copy status parameters for the logical volume in the logical volume management table;

if the communication message is a discovery session request and if the discovery session request includes an initiator name argument that does not correspond to one of the initiator modules described in the set of associations:

adding an initiator name corresponding to the initiator name argument to the second set of initiator names and a maximum disk usage parameter for an initiator module identified by the added initiator name in the initiator management table, calculating a combination of a RAID level and an allocatable disk usage capacity parameter for each of the logical volumes that are allocatable to the identified initiator module according to the updated maximum disk usage parameter for the identified initiator module, and adding an association having a target name that identifies a target for each of the logical volumes that are allocatable to the identified initiator module in the set of associations, if the communication message is a normal session request, if the normal session request includes an initiator name argument and a target name argument that correspond to the initiator name and the target name of an association in the set of associations, and if the target name corresponding to the target name argument identifies a target for deletion:
  deleting each association in the set of associations that includes a target name identifying the same logical volume identified by the target name corresponding to the target name argument, and
if the communication message is a normal session request, if the normal session request includes an initiator name argument and a target name argument that correspond to the initiator name and the target name of an association in the set of associations, and if the target name corresponding to the target name argument does not identify a target for deletion:
  allocating the logical volume identified by the target name corresponding to the target name argument to the initiator module identified by the initiator name corresponding to the initiator name argument,
  setting the disk usage capacity parameter of the identified logical volume that is allocated to the identified initiator module according to the RAID level and the allocatable disk usage capacity parameter of the identified logical volume specified by the target name corresponding to the target name argument, and
  deleting each association in the set of associations that includes a target name identifying the same logical volume identified by the target name corresponding to the target name argument that is not allocated to one of the initiator modules.

5. The management method according to claim 4, further comprising creating, as response information for the host computer, volume information that includes information regarding processing that is executable by the one or more target modules depending on the set of pair status parameters in the logical volume management table for a first logical volume of the plurality of logical volumes allocated to the host computer.

6. The management method according to claim 4, further comprising creating, as response information for the host computer, volume information that includes information regarding the set of data copy status parameters in the logical volume management table for a first logical volume of the plurality of logical volumes allocated to the host computer.

7. A storage device that provides a host computer that includes one or more initiator modules with a plurality of logical volumes each including a storage area from which data can be read and to which data can be written the storage device including:
  a controller component; and
  a memory component including one or more target modules, a target management table, an initiator management table, and a logical volume management table,
  the one or more target modules establishing the one or more pairs of logical volumes and performing resynchronization and data restoration operations between the primary volumes and secondary volumes of the one or more pairs of logical volumes,
  the target management table providing a set of associations between a first set of initiator names each identifying one of the initiator modules, a set of target names each identifying one of the logical volumes and each including a set of volume information related to the identified logical volume, and a disk usage capacity parameter for each of the initiator modules of each of the logical volumes that are allocated to the initiator module,
  the initiator management table providing a second set of initiator names each identifying one of the initiator modules and a maximum disk usage parameter for each initiator module identified in the second set of initiator names,
  the logical volume management table providing a third set of initiator names each identifying one of the initiator modules, a set of logical volume identifiers each identifying one of the logical volumes, and a set of pair status parameters and a set of data copy status parameters for each of the logical volumes identified in the set of logical volume identifiers,
  wherein the controller component operates to process a communication message transmitted to the one or more target modules from the one or more initiator modules according to Internet Small Computer Systems Interface (iSCSI) standards,
  wherein if the communication message is a discovery session request and if the discovery session request includes an initiator name argument that corresponds to one of the initiator names included in the initiator management table, the controller component operates to:
    update the maximum disk usage parameter for the initiator module identified by the corresponding initiator name in the initiator management table by subtracting the sum of the disk usage capacity parameters of each of the logical volumes that are allocated to the identified initiator module in the target management table from the maximum disk usage parameter for the identified initiator module,
    confirm a combination of a Redundant Array of Inexpensive/Independent Disks (RAID) level and an allocatable disk usage capacity parameter for each of the logical volumes that are allocatable to the identified initiator module according to the updated maximum disk usage parameter for the identified initiator module,
    add an association having a target name that identifies a target for each of the logical volumes that are allocatable to the identified initiator module in the set of associations, to create an association having a target name identifying a target for deletion for each of the logical volumes that are allocated to one of the one or more logical volumes in the set of associations,
    add an association having a target name that identifies a target for creating a secondary pair volume for each of the logical volumes that are allocatable to the identified initiator module in the set of associations,
    add an association having a target name that identifies a pair status for each of the logical volumes that are allocatable to the identified initiator module in the set of associations according to the set of pair status parameters for the logical volume in the logical volume management table, and
    add an association having a target name that identifies a data copy status for each of the logical volumes that are allocatable to the identified initiator module in the set of associations according to the set of data copy status parameters for the logical volume in the logical volume management table,
  wherein if the communication message is a discovery session request and if the discovery session request includes an initiator name argument that does not correspond to one of the initiator modules described in the set of associations, the controller component operates to
    add an initiator name corresponding to the initiator name argument to the second set of initiator names and a maximum disk usage parameter for an initiator module identified by the added initiator name in the initiator management table, calculate a combination of a RAID level and an allocatable disk usage capacity parameter for each of the logical volumes that are allocatable to the identified initiator module according to the updated maximum disk usage parameter for the identified initiator module, and add an association having a target name that identifies a target for each of the logical volumes that are allocatable to the identified initiator module in the set of associations, wherein if the communication message is a normal session request, if the normal session request includes an initiator name argument and a target name argument that correspond to the initiator name and the target name of an association in the set of associations, and if the target name corresponding to the target name argument identifies a target for deletion, the controller component operates to:

delete each association in the set of associations that includes a target name identifying the same logical volume identified by the target name corresponding to the target name argument, and wherein if the communication message is a normal session request, if the normal session request includes an initiator name argument and a target name argument that correspond to the initiator name and the target name of an association in the set of associations, and if the target name corresponding to the target name argument does not identify a target for deletion, the controller component operates to:

allocate the logical volume identified by the target name corresponding to the target name argument to the initiator module identified by the initiator name corresponding to the initiator name argument, set the disk usage capacity parameter of the identified logical volume that is allocated to the identified initiator module according to the RAID level and the allocatable disk usage capacity parameter of the identified logical volume specified by the target name corresponding to the target name argument, and delete each association in the set of associations that includes a target name identifying the same logical volume identified by the target name corresponding to the target name argument that is not allocated to one of the initiator modules.

8. The storage controller according to claim 7, wherein the controller component creates, as response information for the host computer, volume information that includes information regarding processing that is executable by the one or more target modules depending on the set of pair status parameters in the logical volume management table for a first logical volume of the plurality of logical volumes allocated to the host computer.

9. The storage controller according to claim 7, wherein the controller component creates, as response information for the host computer, volume information that includes information regarding the set of data copy status parameters in the logical volume management table for a first logical volume of the plurality of logical volumes allocated to the host computer.

* * * * *